(12) United States Patent
Kaji

(10) Patent No.: US 7,177,481 B2
(45) Date of Patent: Feb. 13, 2007

(54) MULTIRESOLUTION UNSHARP IMAGE PROCESSING APPARATUS

(75) Inventor: Daisuke Kaji, Hino (JP)

(73) Assignee: Konica Corporation, Tokyo (JP)

( * ) Notice: Subject to any disclaimer, the term of this patent is extended or adjusted under 35 U.S.C. 154(b) by 635 days.

(21) Appl. No.: 10/024,045

(22) Filed: Dec. 17, 2001

(65) Prior Publication Data

US 2002/0076118 A1 Jun. 20, 2002

(30) Foreign Application Priority Data

Dec. 19, 2000 (JP) ............................. 2000-385405
Dec. 19, 2000 (JP) ............................. 2000-385406

(51) Int. Cl.
*G06K 9/40* (2006.01)
(52) U.S. Cl. ...................... 382/265; 382/266; 382/263; 382/264
(58) Field of Classification Search ......... 382/263–266
See application file for complete search history.

(56) References Cited

U.S. PATENT DOCUMENTS

| 4,317,179 | A | | 2/1982 | Kato et al. | |
|---|---|---|---|---|---|
| 4,536,803 | A | * | 8/1985 | Hennig | ........................ 382/260 |
| 4,561,022 | A | | 12/1985 | Bayer | |
| 5,038,388 | A | * | 8/1991 | Song | ........................... 382/266 |
| 5,050,223 | A | * | 9/1991 | Sumi | ........................... 382/266 |
| 5,204,919 | A | * | 4/1993 | Murakami | ................... 382/263 |
| 5,526,446 | A | * | 6/1996 | Adelson et al. | ............. 382/275 |
| 5,587,898 | A | * | 12/1996 | Palm | ........................... 700/50 |
| 5,694,447 | A | * | 12/1997 | Ito | ............................... 378/62 |
| 5,881,181 | A | * | 3/1999 | Ito | .............................. 382/274 |
| 5,907,642 | A | * | 5/1999 | Ito | .............................. 382/302 |
| 5,949,915 | A | * | 9/1999 | Yamada | ....................... 382/260 |
| 5,960,123 | A | * | 9/1999 | Ito | .............................. 382/274 |
| 5,991,457 | A | * | 11/1999 | Ito et al. | ..................... 382/254 |
| 6,016,356 | A | * | 1/2000 | Ito et al. | ..................... 382/132 |
| 6,035,071 | A | * | 3/2000 | Yamada | ....................... 382/263 |

(Continued)

FOREIGN PATENT DOCUMENTS

EP 0 766 202 A2 4/1997

(Continued)

OTHER PUBLICATIONS

Baxes, G.A., "Digital Image Processing: Principles and Applications", 1994, pp. 88-89, ISBN 0-471-00949-0.*

*Primary Examiner*—Bhavesh M. Mehta
*Assistant Examiner*—Sath V. Perungavoor
(74) *Attorney, Agent, or Firm*—Lucas & Mercanti, LLP

(57) ABSTRACT

The invention concerns an image-processing apparatus, in which a high-frequency component signal of an original image-signal, representing a plurality of pixels, is added to either the original image-signal or a lowest frequency image-signal of the original image-signal, in order to generate a processed image-signal. The image-processing apparatus includes: a conversion-processing section to apply a conversion-processing to unsharp image-signals, generated from the original image-signal in respect to a plurality of frequency bands, so as to generate converted unsharp image-signals; a differential processing section to generate differential image-signals obtained from differences between the unsharp image-signals and the converted unsharp image-signals; and an addition-processing section to totally add the differential image-signals to generate the high-frequency component signal of the original image-signal.

24 Claims, 14 Drawing Sheets

U.S. PATENT DOCUMENTS

| | | | |
|---|---|---|---|
| 6,055,340 A * | 4/2000 | Nagao | 382/261 |
| 6,072,913 A * | 6/2000 | Yamada | 382/275 |
| 6,104,503 A * | 8/2000 | Shimura | 358/1.9 |
| 6,252,995 B1 * | 6/2001 | Takamori | 382/254 |
| 6,373,992 B1 * | 4/2002 | Nagao | 382/266 |
| 6,611,627 B1 * | 8/2003 | LaRossa et al. | 382/240 |
| 6,628,842 B1 * | 9/2003 | Nagao | 382/266 |
| 6,754,398 B1 * | 6/2004 | Yamada | 382/260 |
| 6,847,738 B1 * | 1/2005 | Scognamiglio et al. | 382/260 |
| 7,072,524 B1 * | 7/2006 | Yamada | 382/260 |
| 2004/0091166 A1 * | 5/2004 | Yamada | 382/260 |
| 2005/0008254 A1 * | 1/2005 | Ouchi et al. | 382/284 |

FOREIGN PATENT DOCUMENTS

EP     01 12 9998     4/2005

* cited by examiner

| 0.0025 | 0.0125 | 0.02 | 0.0125 | 0.0025 |
|---|---|---|---|---|
| 0.0125 | 0.0625 | 0.1 | 0.0625 | 0.0125 |
| 0.02 | 0.1 | 0.16 | 0.1 | 0.02 |
| 0.0125 | 0.0625 | 0.1 | 0.0625 | 0.0125 |
| 0.0025 | 0.0125 | 0.02 | 0.0125 | 0.0025 |

Binomial Filter × 8

| 1 | 8 | 28 | 56 | 72 | 56 | 28 | 8 | 1 |
|---|---|---|---|---|---|---|---|---|
| 1.3 | 7.6 | 26.6 | 56.2 | 72.2 | 56.2 | 26.6 | 7.6 | 1.3 |

σ^2=2 GAUSSIAN DISTRIBUTION

| 1/16 | 1/8 | 1/16 |
|---|---|---|
| 1/8 | 1/4 | 1/8 |
| 1/16 | 1/8 | 1/16 |

MULTIRESOLUTION UNSHARP IMAGE PROCESSING APPARATUS

BACKGROUND OF THE INVENTION

This invention relates to an image processing apparatus, or more precisely, an image processing apparatus using a multiple resolution processing.

The processing section of a radiation image uses a method that adds conversion processing to an original image signal. FIG. 20 illustrates an explanation of a conventional frequency emphasizing-processing. Processed image signals are created by creating unsharp image signal 2 from original image signal 1 generating differential image signal 3 by subtracting said unsharp image signal 2 from original image signal 1, and adding the result of multiplication between coefficient β and said differential image signal 3 to original image signal 1 as a correction signal.

FIG. 21 illustrates an explanation of a conventional dynamic range compression processing. Identical codes are assigned to the items identical in FIG. 20. In this case, differential image signal 3 is generated by creating unsharp image signal 2 from original image signal 1 and subtracting unsharp image signal 2 from original image signal 1. At the same time, compensation image signal 5 is obtained by adding density-compensating conversion 4 to unsharp image signal 2. A processed image signal is obtained by adding differential image signal 3 to said compensation-image signal 5 that was obtained. Recently, a method for obtaining sharper processed image signals has been developed by improving said image processing method.

As one of the techniques, a multiple resolution method is available. Image processing using said multiple resolution method obtains image signals by decomposing an original image signal into image signals of multiple frequency bands, adding specified image processing, and restoring said image signals. Image processing using said multiple resolution method is introduced in (Digital Image Processing: Springer-Verlag 1991). Said document does not describe the processing implemented by applying conversion processing to a unsharp image signal or a differential image signal that is decomposed. A pyramid algorithm is available as one of the algorithms for high speed image processing using said multiple resolution method.

Various methods have been proposed as image processing techniques using said pyramid algorithm. However, filters of mask processing used in said techniques are always in a fixed shape (for instance, Japanese Application Patent Laid-Open Publication No. Hei 10-75395 report). Therefore, frequency characteristics of decomposed image signals are identical and consequently are not suitable for more delicate frequency operations.

SUMMARY OF THE INVENTION

To overcome the abovementioned drawbacks in conventional image-processing apparatus, it is an object of the present invention to provide an image-processing apparatus that enables more delicate frequency characteristic operations.

It is another object of the present invention to provide an image-processing apparatus that suppresses deterioration of graininess caused by frequency processing and obtain sufficient emphasis.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

Figure 1:
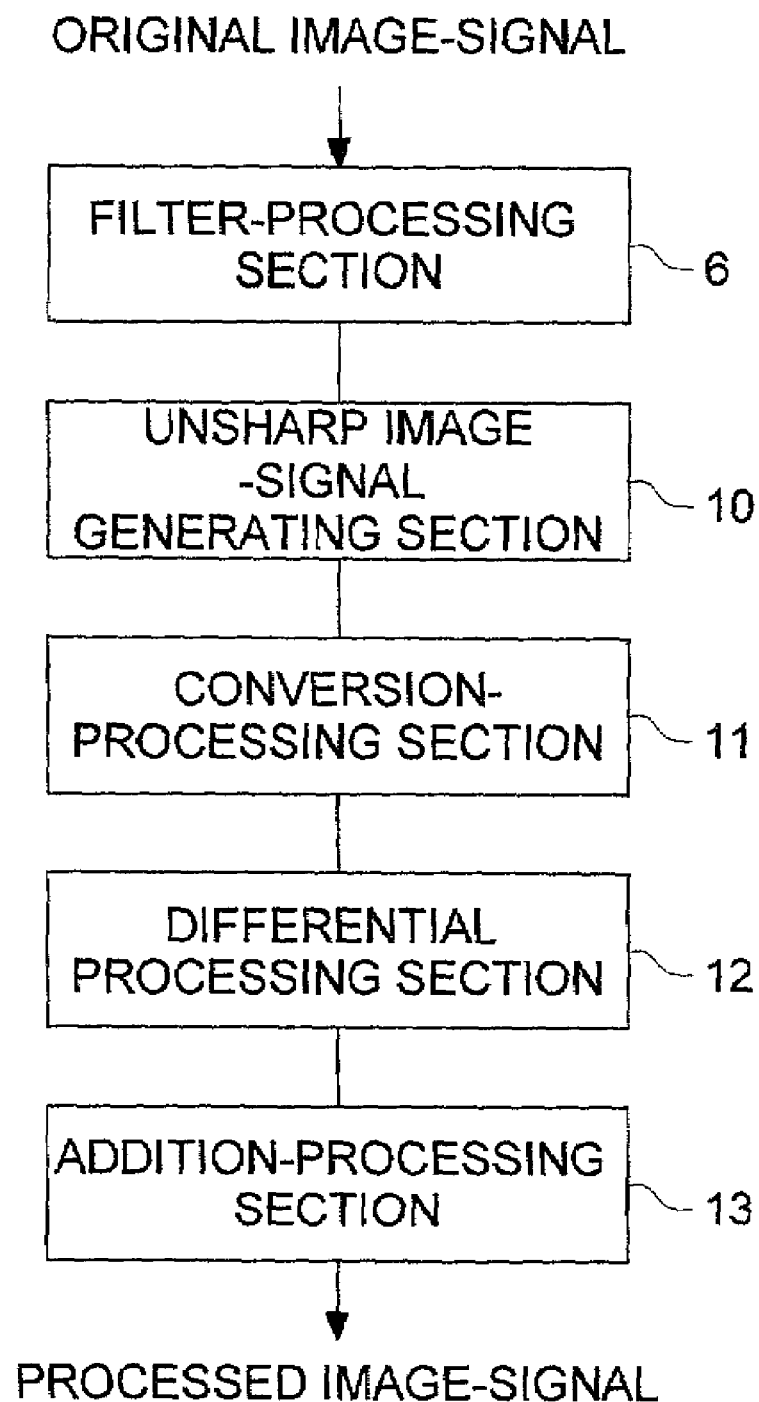
FIG. 1 shows a block diagram of the first embodiment of this invention that performs frequency-emphasizing processing.

Accordingly, to overcome the cited shortcomings, the abovementioned objects of the present invention can be attained by image-processing apparatus described as follow.
(1) An image-processing apparatus, in which a high-frequency component signal of an original image-signal, representing a plurality of pixels, is added to either the original image-signal or a lowest frequency image-signal of the original image-signal, in order to generate a processed image-signal, comprising: a conversion-processing section to apply a conversion-processing to unsharp image-signals, generated from the original image-signal in respect to a plurality of frequency bands, so as to generate converted unsharp image-signals; a differential processing section to generate differential image-signals obtained from differences between the unsharp image-signals and the converted unsharp image-signals; and an addition-processing section to totally add the differential image-signals to generate the high-frequency component signal of the original image-signal.

(2) The image-processing apparatus of item 1, wherein the differential image-signals derive from either differences between the unsharp image-signals in an adjacent pair of the frequency-bands or differences between the original image-signal and the converted unsharp image-signals.

(3) The image-processing apparatus of item 1, wherein the conversion-processing is to convert pixel values of the unsharp image-signals, based on a nonlinear transform.

(4) The image-processing apparatus of item 1, wherein the conversion-processing is determined by the original image-signal or the unsharp image-signals in the plurality of frequency-bands.

(5) The image-processing apparatus of item 1, wherein the conversion-processing is determined by the original image-signal or the unsharp image-signals in adjacent pairs of frequency-bands.

(6) The image-processing apparatus of item 1, wherein the conversion-processing varies depending on either one of pixel value of the unsharp image-signals employed for generating the differential image-signals or pixel values of the original image-signal.

(7) The image-processing apparatus of item 1, wherein the conversion-processing varies depending on the unsharp image-signals.

(8) The image-processing apparatus of item 1, wherein the conversion-processing is a suppression-processing for suppressing an averaging-processing for averaging image-signals.

(9) The image-processing apparatus of item 1, wherein the conversion-processing varies depending on pixel values of the unsharp image-signals to be processed by the conversion-processing.

(10) The image-processing apparatus of item 1, wherein the conversion-processing varies depending on pixel values of an unsharp image-signal at a lowest frequency-band.

(11) The image-processing apparatus of item 1, wherein the conversion-processing varies depending on pixel values of the original image-signal.

(12) The image-processing apparatus of item 8, wherein the lower a frequency-band in which the unsharp image-signals reside is, the greater a degree of suppressing the averaging-action for averaging the image-signals in the suppression-processing is.

(13) The image-processing apparatus of item 8, wherein the higher a frequency-band in which the unsharp image-signals reside is, the stronger a power of suppressing the averaging-action for averaging the image-signals in the suppression-processing is.

(14) An image-processing apparatus, in which a compensation-signal generated from a low-frequency component signal of an original image-signal, representing a plurality of pixels, is added to either the original image-signal or a lowest frequency image-signal of the original image-signal, in order to generate a processed image-signal, comprising: a conversion-processing section to apply a conversion-processing to unsharp image-signals, generated from the original image-signal in respect to a plurality of frequency bands, so as to generate converted unsharp image-signals; a differential processing section to generate differential image-signals obtained from differences between the unsharp image-signals and the converted unsharp image-signals; and a compensation-signal calculating section to totally add the differential image-signals so as to generate a high-frequency component signal, and to calculate the compensation-signal by subtracting the low-frequency component signal form a converted low-frequency component signal, which is derived from a difference between the high-frequency component signal and the original image-signal.

(15) The image-processing apparatus of item 14, wherein the differential image-signals are derived from either differences between the unsharp image-signals in adjacent pairs of the frequency-bands or differences between the original image-signal and the converted unsharp image-signals.

(16) The image-processing apparatus of item 14, wherein the conversion-processing is to convert pixel values of the unsharp image-signals, based on a nonlinear transform.

(17) The image-processing apparatus of item 14, wherein the conversion-processing is determined by the original image-signal or the unsharp image-signals in the plurality of frequency-bands.

(18) The image-processing apparatus of item 14, wherein the conversion-processing is determined by the original image-signal or the unsharp image-signals in an adjacent pair of frequency-bands.

(19) The image-processing apparatus of item 14, wherein the conversion-processing varies depending on either one of pixel value of the unsharp image-signals employed for generating the differential image-signals or pixel values of the original image-signal.

(20) The image-processing apparatus of item 14, wherein the conversion-processing varies depending on the unsharp image-signals.

(21) The image-processing apparatus of item 14, wherein the conversion-processing is a suppression-processing for suppressing an averaging-processing for averaging image-signals.

(22) The image-processing apparatus of item 14, wherein the conversion-processing varies depending on pixel values of the unsharp image-signals to be processed by the conversion-processing.

(23) The image-processing apparatus of item 14, wherein the conversion-processing varies depending on pixel values of an unsharp image-signal at a lowest frequency-band.

(24) The image-processing apparatus of item 14, wherein the conversion-processing varies depending on pixel values of the original image-signal.

(25) The image-processing apparatus of item 21, wherein the lower a frequency-band in which the unsharp image-signals reside is, the greater a degree of suppressing the averaging-processing for averaging the image-signals in the suppression-processing is.

(26) The image-processing apparatus of item 21, wherein the higher a frequency-band in which the unsharp image-signals reside is, the stronger a power of suppressing the averaging-action for averaging the image-signals in the suppression-processing is.

(27) An image-processing apparatus, comprising: an unsharp image-signal generating section to generate unsharp image-signals from an original image-signal in respect to a plurality of frequency-bands; a differential processing section to generate differential image-signals from differences between the original image-signal and the unsharp image-signals, and to apply a conversion-processing to the differential image-signals so as to generate converted differential image-signals; and an addition processing section to add the converted differential image-signals to the original image-signal or a lowest frequency image-signal to generate a processed image-signal; wherein the conversion-processing varies depending on pixel values of the unsharp image-signals.

(28) The image-processing apparatus of item 27, further comprising: a compensation-signal calculating section to generate a compensation-signal which is derived from a low-frequency component signal obtained by subtracting a total sum of the converted differential image-signals from the original image-signal; wherein the addition processing section adds the compensation-signal, instead of the converted differential image-signals, to the original image-signal or the lowest frequency image-signal to generate the processed image-signal.

(29) The image-processing apparatus of item 28, wherein the differential image-signals derive from either differences between the unsharp image-signals in adjacent pairs of the frequency-bands or differences between the original image-signal and the unsharp image-signals.

(30) The image-processing apparatus of item 28, wherein the differential image-signals on which the conversion-processing depends are either anyone of image-signals utilized for obtaining the differential image-signals or both of them.

(31) The image-processing apparatus of item 28, wherein the conversion-processing applied to the differential image-signals varies depending on the differential image-signals.

(32) The image-processing apparatus of item 28, wherein the conversion-processing applied to the differential image-signals is a suppression-processing for suppressing an absolute pixel value at least at a part of image-signals.

(33) The image-processing apparatus of item 32, wherein the lower a frequency-band in which the differential image-signals reside is, the stronger a power of suppressing the absolute pixel value of the image-signals in the suppression-processing is.

(34) The image-processing apparatus of item 32, wherein the higher a frequency-band in which the differential image-signals reside is, the stronger a power of suppressing the absolute pixel value of the image-signals in the suppression-processing is.

(35) The image-processing apparatus of item 28, wherein a conversion-function is determined by designating a frequency characteristic, so as to realize a given frequency characteristic, and processing are conducted on the basis of the conversion-function.

(36) The image-processing apparatus of item 35, wherein the frequency characteristic can be changed depending on density.

(37) The image-processing apparatus of item 35, wherein the frequency characteristic can be changed depending on density of either the original image-signal or the unsharp image-signals for every differential image-signal.

(38) The image-processing apparatus of item 35, wherein sets of parameters for processing the frequency characteristic are provided in the image-processing apparatus, a kind of processing can be designated by selecting one set out of the sets of parameters.

(39) An image-processing apparatus, comprising: a filter-processing section to apply a mask-processing to an original image-signal, representing a plurality of pixels, with a mask so as to generate filtered original image-signals; an unsharp image-signal generating section to generate unsharp image-signals from the filtered original image-signals; a differential processing section to generate differential image-signals from differences between the original image-signal and the unsharp image-signals, or from differences between the unsharp image-signals themselves; and an addition processing section to add the differential image-signals to the original image-signal or a lowest frequency image-signal with respect to the original image-signal in order to generate a processed image-signal ; wherein a frequency characteristic of the processed image-signal can be varied by changing a frequency characteristic of the mask employed for the mask-processing.

(40) The image-processing apparatus of item 39, further comprising: a compensation-signal calculating section to generate a compensation-signal which is derived from a low-frequency component signal obtained by subtracting a total sum of the differential image-signals from the original image-signal; wherein the addition processing section adds the compensation-signal, instead of the differential image-signals, to the original image-signal or the lowest frequency image-signal to generate the processed image-signal.

(41) The image-processing apparatus of item 40, wherein the mask-processing is repetitions of filtering-processing with a specific filter.

(42) The image-processing apparatus of item 41, wherein the mask employed for the repetitions of filter-processing is a simple average.

(43) The image-processing apparatus of item 41, wherein the mask employed for the repetitions of filter-processing is a simple average of 2 pixels ×2 pixels.

(44) The image-processing apparatus of item 40, wherein a number of the repetitions of filter-processing designates the frequency characteristic of the processed image-signal.

(45) The image-processing apparatus of item 40, wherein the frequency characteristic of the processed image-signal is specified by designating weight of the mask with variance values of a normal distribution, and a number of the repetitions of filter-processing, which is approximate to the variance values of the normal distribution, is calculated to process image-signals.

(46) The image-processing apparatus of item 40, wherein the mask-processing varies depending on the unsharp image-signals.

(47) The image-processing apparatus of item 40, wherein the mask-processing varies depending on the original image-signal.

(48) The image-processing apparatus of item 40, wherein the mask-processing varies depending on a frequency characteristic of the original image-signal.

(49) An image-processing apparatus, comprising: an unsharp image-signal generating section that employs a pyramid algorithm to generate a plurality of unsharp image-signals , resolutions of which are different relative to each other, from a original image-signal representing a plurality of pixels; a differential processing section to generate differential image-signals from differences between the original image-signal and the unsharp image-signals, or from differences between the unsharp image-signals themselves; and an addition processing section to add the differential image-signals to the original image-signal or a lowest frequency image-signal with respect to the original image-signal in order to generate a processed image-signal ; wherein a frequency characteristic of the processed image-signal can be varied by changing an interpolation-processing method for adding or subtracting the unsharp image-signals .

(50) The image-processing apparatus of item 49, further comprising: a compensation-signal calculating section to generate a compensation-signal which is derived from a low-frequency component signal obtained by subtracting a total sum of the differential image-signals from the original image-signal; wherein the addition processing section adds the compensation-signal, instead of the differential image-signals, to the original image-signal or the lowest frequency image-signal to generate the processed image-signal.

(51) The image-processing apparatus of item 50, wherein the interpolation-processing is repetitions of filter-processing with a specific filter.

(52) The image-processing apparatus of item 51, wherein a mask employed for the repetitions of filter-processing is a simple average.

(53) The image-processing apparatus of item 51, wherein a mask employed for the repetitions of filter-processing is a simple average of 2 pixels ×2 pixels.

(54) The image-processing apparatus of item 50, wherein a number of the repetitions of filter-processing designates the frequency characteristic of the processed image-signal.

(55) The image-processing apparatus of item 50, wherein the interpolation-processing is performed on the basis of a sampling function of the original image-signal.

(56) The image-processing apparatus of item 50, wherein the interpolation-processing is a linear-interpolation processing.

(57) The image-processing apparatus of item 50, wherein the interpolation processing is a spline-interpolation processing.

(58) The image-processing apparatus of item 50, wherein the interpolation-processing varies depending on a frequency band of an interpolated image-signal.

(59) The image-processing apparatus of item 50, wherein the interpolation-processing varies depending on the original image-signal.

(60) The image-processing apparatus of item 50, wherein the interpolation-processing varies depending on a frequency characteristic of the original image-signal.

(61) An image-processing apparatus, comprising: an unsharp image-signal generating section that employs a pyramid algorithm to generate a plurality of unsharp image-signals, resolutions of which are different relative to each other, from a original image-signal representing a plurality of pixels; a differential processing section to generate differential image-signals from differences between the original image-signal and the unsharp image-signals, or from differences between the unsharp image-signals themselves; and an addition processing section to add the differential image-signals to the original image-signal or a lowest frequency image-signal with respect to the original image-signal in order to generate a processed image-signal; wherein a mask-processing is employed for generating the unsharp image-signals in a process of the pyramid algorithm, and a reduction rate of the unsharp image signals, caused by a down sampling processing, varies depending on a frequency characteristic of a mask.

(62) The image-processing apparatus of item 61, further comprising: a compensation-signal calculating section to generate a compensation-signal which is derived from a low-frequency component signal obtained by subtracting a total sum of the differential image-signals from the original image-signal; wherein the addition processing section adds the compensation-signal, instead of the differential image-signals, to the original image-signal or the lowest frequency image-signal to generate the processed image-signal.

(63) The image-processing apparatus of item 62, wherein the mask-processing is repetitions of filter-processing with a specific filter.

(64) The image-processing apparatus of item 62, wherein the mask employed for the repetitions of filter-processing is a simple average.

(65) The image-processing apparatus of item 62, wherein the mask employed for the repetitions of filter-processing is a simple average of 2 pixels×2 pixels.

(66) The image-processing apparatus of item 62, wherein the mask-processing varies depending on the unsharp image-signals.

(67) The image-processing apparatus of item 62, wherein the mask-processing varies depending on the original image-signal.

(68) The image-processing apparatus of item 62, wherein the mask-processing varies depending on a frequency characteristic of an original image-signal.

(69) The image-processing apparatus of item 62, wherein a variation of the frequency characteristic of the mask or a change of an interpolation-processing is determined by designating a frequency characteristic.

(70) The image-processing apparatus of item 69, wherein the designated frequency characteristic can be changed depending on a density of the original image-signal or the unsharp image-signals.

(71) The image-processing apparatus of item 69, wherein the designated frequency characteristic can be changed depending on a density of the original image-signal or the unsharp image-signals for each of the unsharp image-signals and the differential image-signals.

(72) The image-processing apparatus of item 39, wherein sets of parameters for processing the frequency characteristic are provided in the image-processing apparatus, a kind of processing can be designated by selecting one set out of the sets of parameters.

(73) An image-processing apparatus, comprising: an unsharp image-signal generating section to generate a plurality of unsharp image-signals from a original image-signal, representing a plurality of pixels; a differential processing section to generate differential image-signals from the unsharp image-signals or the original image signal; and an addition processing section to add the differential image-signals to the original image-signal or a lowest frequency image-signal with respect to the original image-signal in order to generate a processed image-signal ; wherein repetitions of filter-processing with a specific filter are conducted for generating the unsharp image-signals.

(74) The image-processing apparatus of item 73, further comprising: a compensation-signal calculating section to generate a compensation-signal which is derived from a low-frequency component signal obtained by subtracting a total sum of the differential image-signals from the original image-signal; wherein the addition processing section adds the compensation-signal, instead of the differential image-signals, to the original image-signal or the lowest frequency image-signal to generate the processed image-signal.

(75) The image-processing apparatus of item 73, wherein a mask employed for the repetitions of filter-processing is a simple average.

(76) The image-processing apparatus of item 73, wherein a mask employed for the repetitions of filter-processing is a simple average of 2 pixels×2 pixels.

(77) The image-processing apparatus of item 73, wherein a mask-processing varies depending on the unsharp image-signals.

(78) The image-processing apparatus of item 73, wherein a mask-processing varies depending on the original image-signal.

(79) The image-processing apparatus of item 73, wherein a mask-processing varies depending on a frequency characteristic of the original image-signal.

(80) The image-processing apparatus of item 76, wherein a number of repetitions of the single average of 2 pixels×2 pixels is not less than 16.

(81) The image-processing apparatus of item 76, wherein a number of repetitions of the single average of 2 pixels×2 pixels is not less than 8.

Further, to overcome the abovementioned problems, other image-processing apparatus, embodied in the present invention, will be described as follow:

(82) The image processing apparatus that obtains a processed image signal by adding a high-frequency component signal of an original image signal for said original image signal comprising multiple pixels to said original image signal or a lowest frequency image signal said original signal, wherein said high-frequency component signal is obtained that by adding a differential image signal obtained by applying conversion processing to unsharp image signals of multiple frequency bands that are generated from said original image signal and adding a difference between said unsharp image signal and said converted image signal.

By applying this configuration, a differential image signal that is added to an original image signal is adjusted by converting an unsharp image signal and, consequently, a processing image signal can be created with controlling noise and artifacts together with an edge emphasis.

(83) The image processing apparatus, wherein said differential image signals derive from either differences between said unsharp image signals in adjacent pairs of frequency bands or differences between said original image signal and said converted unsharp image signals.

By applying this configuration, frequency band overlapping sections of differential image signals are reduced by taking differences between adjacent pairs of unsharp image signals and by applying conversion processing to said unsharp image signals, operation in band units is enabled.

(84) The image processing apparatus, wherein said conversion processing applied to said unsharp image signals of said multiple frequency bands converts pixel values of said original image signals of said unsharp image signals based on nonlinear conversion.

By applying this configuration, edge emphasis and control of noise and artifacts are enabled by performing non-linear conversion.

(85) The image processing apparatus, wherein conversion processing that is applied to unsharp image signals of said multiple frequency bands is determined by said original image signal or said unsharp image signals of said multiple frequency band.

By applying this configuration, processing depending on an unsharp tendency of image signals can be performed, and consequently, effective edge emphasis and noise and artifacts control are enabled.

(86) The image processing apparatus, wherein said conversion processing applied to said unsharp image signals of said multiple frequency bands is determined by said unsharp image signals in adjacent-pairs of frequency bands or said original image signal.

By applying this configuration, processing depending on an unsharp tendency of image signals can be performed, and consequently, effective edge emphasis and noise and artifacts control are enabled.

(87) The image processing apparatus, wherein said conversion processing that is applied to said unsharp image signals of said multiple frequency bands varies according to a pixel value of either one of said unsharp image signals or said original unsharp image signal that is used for generating said differential image signals.

By applying this configuration, processing depending on pixels prior to unsharp processing can be performed, enabling conversion with more consideration to high frequency component signals, and consequently, more effective edge emphasis and control of artifacts and noise are enabled.

(88) The image processing apparatus, wherein said conversion processing that is applied to said unsharp image signals of said multiple frequency bands vary according to said unsharp image signals.

By applying this configuration, adjustments depending on frequency bands can be made and more effective edge emphasis and control of noise and artifacts are enabled.

(89) The image processing apparatus, wherein said conversion processing that is applied to said unsharp image signals control averaging of image signals.

By applying this configuration, unsharpness is controlled in a high contrast section, which is a cause of overshoot/undershoot and consequently, effective edge emphasis and control of noise and artifacts are enabled.

(90) The image process apparatus, wherein said conversion processing that is applied varies depending on pixel values of said unsharp image signals to be processed by said conversion processing.

By applying this configuration, processing depending on signal values of unsharp image signals become possible and by enhancing control of artifacts of signals with noticeable noise signal (density), more effective edge emphasis and control of noise and artifacts are enabled.

(91) The image processing apparatus, wherein said conversion processing that is applied to said unsharp image signals varies depending on pixel values of said unsharp images at lowest frequency band.

By applying this configuration, changes of conversion of unsharp image signals may follow a major configuration of an original image signal.

(92) The image processing apparatus wherein said conversion processing that is applied to said unsharp image signals varies depending on pixel values of said original signal.

By applying this configuration, changes of conversion of unsharp images may follow an original image signal faithfully.

(93) The image processing apparatus, wherein a degree of averaging control of said conversion processing that is applied to said unsharp image signals increases as frequency bands of said unsharp images become lower.

By applying this configuration, a degree of compensation increases as frequency bands become lower and consequently, image signals of higher quality may be obtained.

(94) The image processing apparatus, wherein a degree of averaging control of said conversion processing that is applied to said unsharp image signals increases as frequency bands of said unsharp image signals become higher.

By applying this configuration, averaging control increases for high frequency component signals that tend to contain many noise component signals and consequently effective edge emphasis and control of noise and artifacts are enabled.

(95) The image processing apparatus that obtains processed image signals by adding compensation signals that are obtained from low frequency component signals of an original signal to said original signal or a low frequency image signal comprising multiple pixels, wherein said compensation signals are obtained by applying conversion processing to unsharp image signals of multiple frequency bands that are generated from said original signal, generating high-frequency image signals that are obtained adding differential image signals that are obtained by differences between said unsharp image signals and said image signals generated after said conversion processing, and obtaining differences of said low frequency image signals from results of conversion of low frequency image signals that are obtained from differences between said high frequency image signals and said original image signal.

By applying this configuration, a compensation section that is added to an original image signal or super low frequency image signal, processing image signals can be generated by applying both image signal dynamic range compression and control of noise and artifacts.

(96) The image processing apparatus that, obtains processed image signals by generating unsharp image signals of multiple frequency bands for an original image signal consisting of multiple pixels, applying conversion processing to differential image signals of said unsharp image signals, and adding to an original image signal or lowest frequency image signals, or adding a compensation signal that is calculated from a low frequency component signal that is obtained from a difference between said original image signal and a result of multiplication of a differential signal after said conversion processing to an original image processing or a lowest frequency image processing, wherein said conversion processing varies depending on pixel values of said unsharp image signals.

By applying this configuration, emphasis of bands containing many noises in signal areas where noises are noticeable can be controlled by adjusting differential image signals that are added to an original image signal or lowest frequency band image signals, depending on signal values of unsharp images and consequently, more effective edge emphasis and control of noise and artifacts are enabled.

(97) The image processing apparatus, wherein said differential image signal indicate a difference between unsharp image signals of a pair of adjacent frequency bands or a difference between an original image signal and a converted unsharp image signal.

By applying this configuration, a frequency band overlapping section of each differential signal is reduced by determining a difference between a pair of adjacent image signals and operation by band units is enabled by matching conversion processing to unsharp image signals.

(98) The image processing apparatus, wherein said unsharp image signal on which said conversion processing depends is an image signal of either of both of said image signals used when said differential signals were obtained.

By applying this configuration, an unsharp image signal of an image size identical to a converted image signal can be used when a pyramid algorithm is used also and consequently, processing can be simplified.

(99) The image processing apparatus, wherein conversion processing that is applied to said multiple differential image signals varies depending on said differential image signals.

By applying this configuration, adjustments depending on frequency bands are enabled and consequently more effective edge, emphasis and control of noise and artifacts are enabled.

(100) The image processing apparatus, wherein conversion processing that is applied to said differential image signals controls absolute values of pixel values in at least some image signals.

By applying this configuration, emphasis on a high contrast section, which is a cause of overshoot/undershoot is controlled and consequently, more effective edge emphasis and control of noise and artifacts are enabled.

(101) The image processing apparatus, wherein control of absolute values of image signals by conversion processing that is applied to said differential image signals increases as frequency bands of said differential image signals become lower.

By applying this configuration, the lower the frequency band in the differential image signal, the greater the control of the absolute value becomes, enabling generation of sharper image signals with control of noise and artifacts more effectively.

(102) The image processing apparatus, wherein control of absolute values of image signals by conversion processing that is applied to said differential image signals increase as frequency bands of said differential image signals become higher.

By applying this configuration, control over absolute values increases as a frequency section that tends to contain many noise component signals becomes high and consequently, more effective edge emphasis and control of noise and artifacts are enabled.

(103) The image processing apparatus, wherein a conversion function that actualizes given frequency characteristics is determined by specifying frequency characteristics and processing is performed by said conversion function that was determined.

By applying this configuration, users only need to specify required frequency characteristics without having to be aware of various parameters to be set and consequently, processing is simplified.

(104) The image processing apparatus, wherein specification of said frequency characteristics can be changed according to a density.

By applying this configuration, users can easily specify processing depending on signal values such as control of noise emphasis by operating frequency characteristics of signal areas containing noticeable noise.

(105) The image processing apparatus, wherein specification of said frequency characteristics can be changed depending on a density for each of unsharp image signals or differential image signals.

By applying this configuration, users can easily set an intensity of processing depending on signal values for each frequency band.

(106) The image processing apparatus, wherein a set of parameters is specified in said frequency characteristic processing and processing can be specified by selecting said set of parameters.

The image processing apparatus, wherein users can select an optimum parameter set easily without manipulating many parameters.

(107) The image processing apparatus that obtains processed image signals by generating multiple unsharp image signals for an original image signal consisting of multiple pixels and adding compensation signals that are obtained by adding a differential signal between said original image signal and said unsharp image signal or a differential image signal between said unsharp image signal and another said unsharp image signal to said original image signal or a lowest frequency image signal for said original image signal or calculating a difference of a result of multiplication of said differential image signal, to said original image signal or said lowest frequency image signal, wherein frequency characteristics of processing image signals are changed by changing mask frequencies used for mask processing for generating said unsharp image signals.

By applying this configuration, more delicate frequency characteristic adjustments are enabled for processing images by changing mask frequency characteristics.

(108) The image processing apparatus, wherein said mask processing is specific filter repetition processing.

By applying this configuration, frequency characteristics can be adjusted at high speed without using multiple filters.

(109) The image processing apparatus, wherein a mask of said repetition processing is a simple average.

By applying this configuration, frequency characteristics can be adjusted at high speed.

(110) The image processing apparatus, wherein a mask of said repetition processing is a simple average of 2 pixels ×pixels.

By applying this configuration, unsharp image signals can be generated at high speed and also according to normal distribution.

(111) The image processing apparatus, wherein frequency characteristics of said processing image signals are specified by a processing repetition count of said repetition processing.

By applying this configuration, frequency characteristics can be specified easily.

(112) The image processing apparatus, wherein frequency characteristics of said processing image signals are specified by designating a weight of a mask at generation of unsharp image signals using a variance value of normal distribution and processing is performed by calculating said mask processing repetition count approximating with normal distribution of said variance value that was specified.

By applying this configuration, frequency characteristics can be specified easily.

(113) The image processing apparatus, wherein said mask processing varies depending on said unsharp image signal.

By applying this configuration, frequency characteristics may be adjusted according to a frequency band.

(114) The image processing apparatus, wherein said mask processing varies depending on an original image signal.

By applying this configuration, frequency characteristics may be adjusted according to a type of an original image signal, for instance, body parts to be examined.

(115) The image processing apparatus, wherein said masking processing varies depending on frequency characteristics of said original image signal.

By applying this configuration, adjustments according to frequency characteristics of an original image signal are enabled for controlling frequency bands with excessive noise.

(116) The image processing apparatus that obtains processed image signals by generating multiple unsharp image signals of different resolutions using a pyramid algorithm for an original image signal consisting of multiple pixels and adding a differential image signal between said original image signal and said unsharp image signal or a differential signal between said unsharp image signals to an original image signal or a lowest frequency image signal, or adding a compensation signal obtained by calculating a difference of a result of adding or sum of said differential image signals to an original image signal or a lowest frequency image signal, wherein frequency characteristics of image processing signals are changed by a changing interpolation-processing method for addition or subtraction of said image signals of different resolutions.

By applying this configuration, more delicate frequency characteristic adjustments of processing image signals are enabled by changing frequency of interpolation-processing.

(117) The image signal apparatus, wherein said interpolation-processing is performed based on a sampling function of an original image signal.

By applying this configuration, frequency characteristics of unsharp image signals can be reproduced more faithfully.

(118) The image signal apparatus, wherein said interpolation-processing performs linear interpolation.

By applying this configuration, processing can be preformed at a high speed without making major changes in frequency characteristics of unsharp image signals.

(119) The image signal apparatus, wherein said interpolation-processing is spline interpolation.

By applying this configuration, smooth interpolation is achieved.

(120) The image signal apparatus, wherein said interpolation-processing varies depending on frequency bands of interpolation image signals.

By applying this configuration, frequency characteristics may be adjusted for each frequency band.

(121) The image signal apparatus, wherein said interpolation-processing varies depending on an original image signal.

By applying this configuration, frequency characteristics may be adjusted according to a type of an original image signal, for instance body parts examined.

(122) The image signal apparatus, wherein said interpolation-processing varies according to frequency characteristics of an original image signal.

By applying this configuration, adjustments may be made according to frequency characteristics of an original image signal such as controlling of frequency bands with many noise signals.

(123) The image signal apparatus that obtains processed image signals by generating multiple unsharp image signals of different resolutions using a pyramid algorithm for an original image signal consisting of multiple pixels and adding a differential signal between said original image signal and said unsharp image signal or a differential image signal between two of said unsharp image signals to an original image signal or a lowest frequency image signal, or adding a compensation signal that is obtained by determining a difference of multiplication of said differential image signals to an original image signal or a lowest frequency image signal, wherein unsharp image signals are generated by mask processing through said pyramid algorithm and a reduction rate of unsharp image signals by down sampling changes according to mask frequency characteristics.

By applying this configuration, a processing speed may be increased efficiently by changing a reduction rate of image signals depend on frequency characteristics of a mask.

(124) The image processing apparatus, wherein said mask processing varies depending on unsharp image signals.

By applying this configuration, frequency characteristics may be adjusted according to a frequency band.

(125) The image processing apparatus, wherein said mask processing varies depending on an original image signal.

By applying this configuration, frequency characteristics may be adjusted according to a type of an original image, for instance, body parts examined.

(126) The image processing apparatus, wherein said mask processing varies depending on frequency characteristics of an original image signal.

By applying this configuration, adjustments may be made according to frequency characteristics of an original image signal such as controlling of frequency bands with many noise signals.

(127) The image processing apparatus, wherein changes of said frequency characteristics of a mask or changes of interpolation-processing are determined by specified frequency characteristics.

By applying this configuration, users may easily generate image signals of required frequency characteristics by determining characteristics of filters from said frequency characteristics.

(128) The image processing apparatus, wherein specification of said frequency characteristics may be changed according to a density of an original image signal or an unsharp image signal.

By applying this configuration, frequency characteristics may be adjusted effectively such as controlling of emphasis on signal areas where noise is noticeable.

(129) The image processing apparatus, wherein specification of said frequency characteristics may be changed according to a density of an original image signal or an unsharp image signal for each of said unsharp image signals or a differential image signal.

By applying this configuration, frequency characteristics may be adjusted efficiently such as controlling of emphasis of signal areas where noise is noticeable in a frequency bands containing many noise signals.

(130) The image processing apparatus that retains a set of parameters required for processing said frequency characteristics, wherein processing is specified by selecting said set of parameters.

By applying this configuration, users may achieve optimum processing by specifying a set of parameters without setting detailed parameters.

(131) The image processing apparatus that obtains processed image signals by generating multiple unsharp image signals for an original image signal consisting of multiple pixels and adding a differential image signal that is generated from said unsharp image signal or said original image signal to an original image signal or a lowest frequency image signal, or adding a compensation signal derived from a difference of multiplication of said differential image signals to said original image signal or said lowest frequency image signal, wherein filtering processing for generating said unsharp image signals is repetition of specific filters.

By applying this configuration, processing may be simplified.

(132) The image processing apparatus, wherein a mask of said repetition processing is a simple average.

By applying this configuration, processing may be simplified and a processing speed may be increased.

(133) The image processing apparatus, wherein a mask of said repetition processing is a simple average of 2 pixels ×2 pixels.

By applying this configuration, effects equivalent to those achieved from processing by a weighting mask according to Gaussian distribution may be obtained.

(134) The image processing apparatus, wherein said mask processing varies depending on an unsharp image.

By applying this configuration, frequency characteristics may be adjusted according to a frequency band.

(135). The image processing apparatus, wherein said mask processing varies depending on an original image signal.

By applying this configuration, frequency characteristics may be adjusted according to a type of an original image, for instance, body parts examined.

(136) The image processing apparatus, wherein said mask processing varies depending on frequency characteristics of said original image signal.

By applying this configuration, processing may be varied according to frequency characteristics of an original image signal such as controlling of frequency bands containing many noise signals.

(137) The image processing apparatus, wherein a repetition count of said single average of 2×2 is 16 or greater.

By applying this configuration, frequency band areas contained in each unsharp image signal are reduced to about a half of frequency bands before application of mask processing, enabling disassembly to an optimum frequency band.

(138) The image processing apparatus, wherein a repetition count of said simple average of 2×2 is 8 or greater.

By applying this configuration, frequency bands contained in each unsharp image signal are reduced to about a half of frequency band before application of mask processing, enabling disassembly to an optimum, frequency band.

FIG. 1 is a block diagram showing the first embodiment of this invention that uses frequency-emphasizing processing. The apparatus shown in the diagram generates unsharp image signals of multiple frequency bands or an original image signal consisting of multiple pixels and obtains processed image signals by adding a differential image signal with the unsharp image signal to the original image signal or a lowest frequency image signal.

In the diagram, 6 indicates a filter-processing section that applies the filtering processing, 10 indicates an unsharp image signal generating section that generates unsharp image signals after receiving output from filter processing section 6, 11 indicates a conversion processing section that applies conversion processing to unsharp image signals that were generated in unsharp image generating section, 12 indicates a differential processing section that finds a difference between an original image signal and a converted image signal and a difference between an unsharp image signal and a converted unsharp image signal, 13 indicates an addition processing section that adds differential image signals that were obtained in the differential processing section. Filter processing section 6, unsharp image generating section 10, conversion processing section 11, differential processing section 12, and addition processing section 13 can be implemented by hardware or software. Operation of the apparatus in this configuration is described below.

Filter processing section 6 applies filtering processing as described before after receiving an original image signal. Unsharp image-generating section 10 receives output from filter processing section 6 and generates unsharp image signals using a pyramid algorithm, for example. Unsharp image-signal generating section 10 generates unsharp image signals of multiple frequency bands of different frequency characteristics. Conversion processing section 11 performs conversion processing for the unsharp image signals that were obtained. All the conversion processing technologies that are publicly available can be used for the conversion processing.

Differential processing section 12 produces a difference between the converted unsharp image signal that was obtained as described above and the original image signal, and a difference between the unsharp image signal and the converted unsharp image signal. The differential image signal that is obtained here is a difference between two unsharp image signals in a pair of adjacent frequency bands or a difference between the original image signal and the converted unsharp image signal. Addition processing section 13 obtains a high frequency component signal by adding the differential image signal that was obtained in differential processing section 12. A processed image signal can be obtained by adding the high frequency component signal to the original image signal or the lowest frequency image signal.

Figure 2:
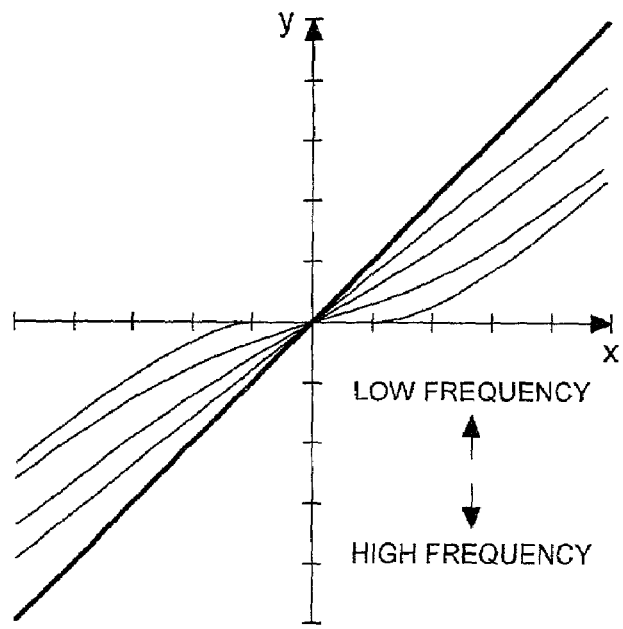
FIG. 2 shows compensation functions of unsharp image signals.

One of the actual processing units in conversion processing section 11 is described below. FIG. 2 shows compensation functions of unsharp images. Horizontal axis x represents signal values that indicate differences between signal values before application of unsharp processing and signal values after application of unsharp processing. Vertical axis y represents compensating component signals, where the upper section is allocated for a function that indicates compensating component signals in a low frequency band and the lower section is allocated for a function that indicates compensating component signals in a high frequency band. These characteristics have a feature for compensating more in an area of greater contrast. The compensating component signal that is obtained consequently is processed by image conversion by being added to an unsharp image signal.

Figure 3:
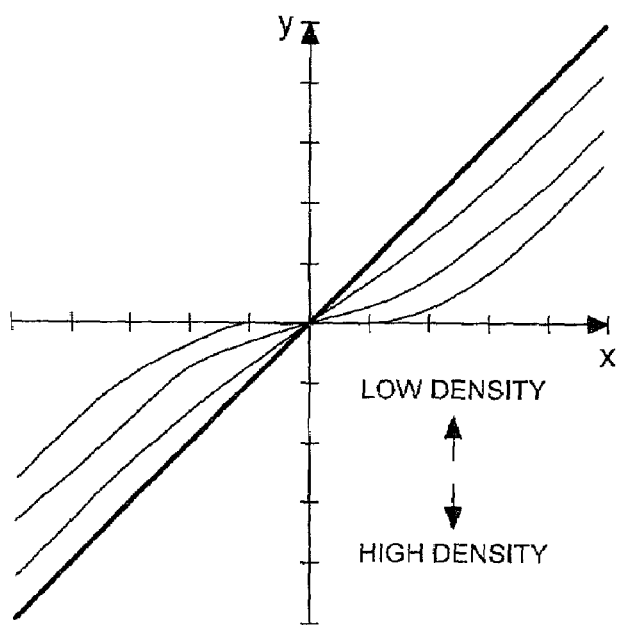
FIG. 3 shows changes of compensation functions related to densities.

As shown in FIG. 3, the function varies according to the density of unsharp image signals. In FIG. 3, horizontal axis x represents signal values that indicate a difference between a signal value before application of unsharp processing and a signal value after application of unsharp processing and vertical axis y represents compensating component signals. The upper section is allocated for the function that indicates compensating component signals in a low density area and the lower section is allocated for the function that indicates compensating component signals in a high density area. Conversion in conversion processing 11 in the embodiment has both characteristics shown in FIG. 2 and FIG. 3. As a result, the lower the density or the lower the frequency band, the closer the image signal is to the unsharp image signal one above or the original image signal.

As a result, the frequency emphasis in the low density area is weakened and consequently grain deterioration can be controlled. When the pixel difference with the unsharp image signal or the original image signal becomes large by averaging, overshoot/undershoot of the emphasizing image signal can be controlled by adding processing that controls averaging that approximates the pixel to the image one above or the original image. By increasing the enhancement of the compensation as the frequency band becomes lower, sharper and better image signals can be obtained.

The configuration in FIG. 1 that is shown above is actualized as the configuration excluding filter processing section 6.

According to the configuration excluding filter processing section 6 a differential image signal that is added to an original image signal is adjusted by conversion of an unsharp image signal and consequently, a processed image signal with edge emphasis and control of noise and artifacts may be generated.

Since said differential image signal is a difference between two unsharp image signals of a pair of adjacent frequency bands or a difference between an original image signal and a converted unsharp image signal, frequency band overlapping sections of differential image signals decrease, enabling operation of each band by matching conversion processing to the unsharp image signal.

In the conversion processing that is applied to said unsharp image signals of said multiple frequency bands can perform effective edge emphasis and control of noise and artifacts, by converting pixel values of unsharp image signals based on non-linear conversion.

Since the conversion processing that is applied to unsharp image signals of said multiple frequency bands is determined through the original image signal or the unsharp image signals of the multiple frequency bands, processing according to the unsharping tendency of image signals can be performed, enabling more effective edge emphasis and control of noise and artifacts.

Since the conversion processing that is applied to unsharp image signals of said multiple frequency bands is determined by unsharp image signals of a pair of adjacent frequency bands or an original image signal, processing according to the unsharping tendency of image signals can be performed, enabling more effective edge emphasis and control of noise and artifacts.

Since the conversion processing that is applied to unsharp image signals of said multiple frequency bands vary according to the other unsharp image signal that is used for generating said differential image signal or the pixel value of original image signal, processing can be performed according to the pixels before application of unsharp processing, enabling conversion considering high frequency component signals and thus more effective edge emphasis and control of noise and artifacts.

Since the conversion processing that is applied to unsharp image signals of said multiple frequency bands varies according to said unsharp image signals, adjustments can be made according to the frequency band, enabling more effective edge emphasis and control of noise and artifacts.

Since conversion processing that is applied to said unsharp image signals controls averaging of image signals, unsharping in the high contrast section, which is the cause of overshoot/undershoot, is controlled, enabling more effective edge emphasis and control of noise and artifacts.

Since conversion processing that is applied to said unsharp image signals varies according to the pixel values of the unsharp image signals, processing can be performed according to the signal values of the unsharp image signals and by enhancing control of artifacts of the signal areas with noticeable noise (density), more effective edge emphasis and control of noise and artifacts are enabled.

Since conversion processing that is applied to said unsharp image signals varies according to the pixel value of the unsharp image of lowest frequency band, conversion variations of the unsharp image signals may follow the major structure of the original image signal.

Since conversion processing of said unsharp image signals varies according to the pixel value of the original image signal, variations of the unsharp image signals faithfully follow the original image signal.

In the conversion processing that is applied to said unsharp image signals, by increasing the tendency of averaging control as the frequency band of the unsharp image signal becomes lower, averaging suppression can be increased as the frequency band becomes lower, enabling generation of sharper image signals with noise and artifacts control.

In the conversion processing that is applied to said unsharp image signals, by increasing the averaging control as the frequency band of the unsharp image signal becomes higher, averaging supression can be increased as the number of noise component signals contained in the high frequency component containing becomes higher, enabling effective edge emphasis and control of noise and artifacts.

Figure 4:
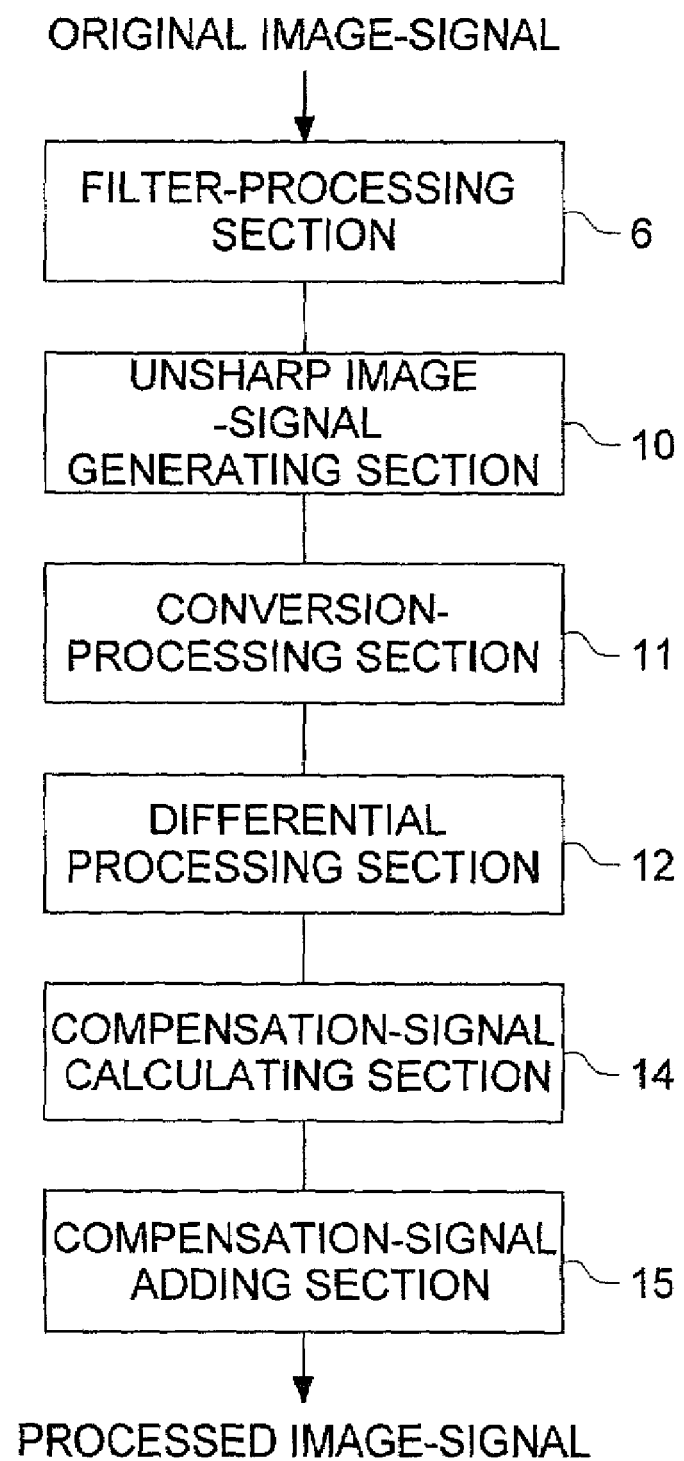
FIG. 4 shows a block diagram of the first embodiment of this invention that performs dynamic range compression processing.

The block diagram in FIG. 4 shows the first embodiment of this invention using dynamic range compression processing. This apparatus configures an image processing apparatus that obtains a processed image signal by calculating a compensation signal from the low frequency component signal that is obtained by producing a difference between an original image signal and an added result of said differential image signals, and adding the compensation signal to the original image signal or a lowest frequency image signal. For the same items as the items in FIG. 3, the same signs in FIG. 3 are assigned.

In the diagram, 6 indicates a filter processing section that applies filtering processing to an original image signal as described above, 10 indicates an unsharp image generating section that receives output from filter processing section 6 and generates unsharp image signals from the original image signal, 11 indicates a conversion processing section that applies conversion processing to the image signals that were generated in unsharp image generating section 10, 12 indicates a differential processing section that indicates a different between an image signal and converted unsharp image signal and a difference between unsharp image signal and a converted unsharp image signal, 14 indicates a compensation signal calculation section that calculates a compensation signal from the low frequency component signal that is obtained by subtracting the high frequency component signal obtained by summing the differential image signals that was obtained in differential processing section 12 from the original image signal, 15 indicates a compensation signal adding section that adds the compensation signal that was obtained in compensation signal calculating section 14. Filter processing 6, unsharp image signal generating section 10, conversion processing section 11, differential processing section 12, compensation signal calculating section, compensation signal calculation section 14, and compensation signal adding section 15 can be processed by hardware or software. The operation of the apparatus in this configuration is described below.

Filter processing section 6 applies filtering processing after receiving an original image signal as described above. Unsharp image signal generating section 10 generates receives output from filter processing section 6 and generates by unsharp image signals through a pyramid algorithm, for instance. Unsharp image signals of multiple frequency bands of different frequency characteristics are obtained from unsharp image signal generating section 10. Conversion processing 11 coverts unsharp image signals that were obtained. All the conversion processing technologies available publicly can be used for the conversion processing.

Differential processing section 12 obtains signal values that indicate a difference between the conversion image signal that is obtained as described above and the original image signal and a difference between the unsharp image signal and the conversion image signal. The differential image signal indicates a signal value that indicates a difference between the two unsharp image signals of a pair of adjacent frequency bands or a difference between the original image signal and the converted unsharp image signal. Then, compensation signal calculating section 14 calculates compensation signals for the differential image signals that were obtained in differential processing section 12.

Figure 22:
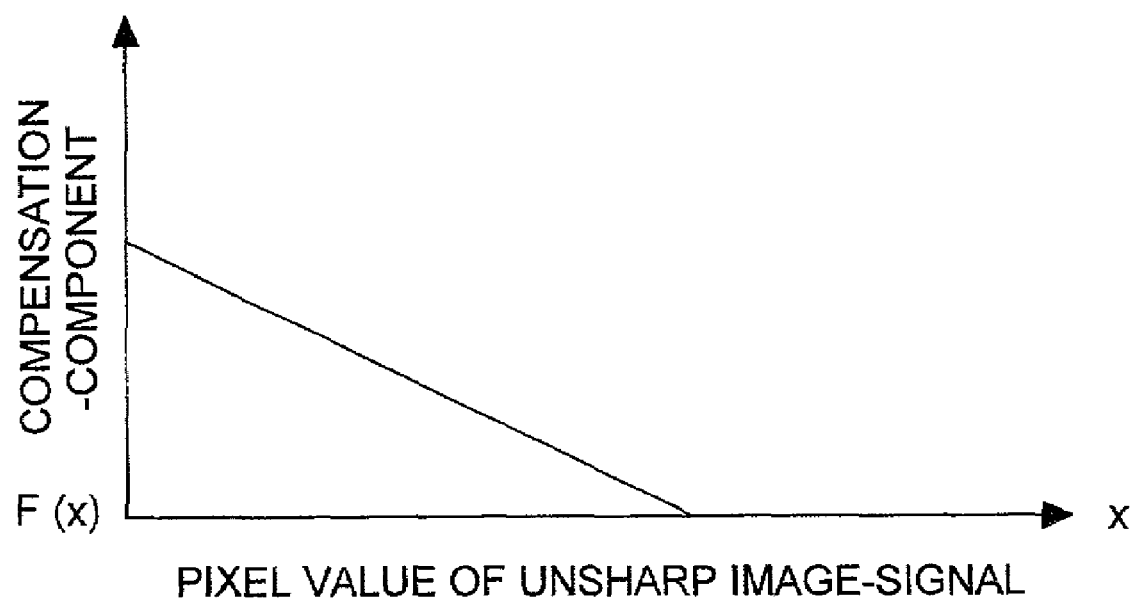
FIG. 22 shows an explanatory illustration of a compensation component calculation.

Compensation component signals are determined as shown in FIG. 22, for instance. FIG. 22 shows compensation component signals in dynamic range compression of a low density section. In the diagram, the horizontal axis is allocated to signal values (x) of unsharp image signals and the vertical axis is allocated to compensation component signals F(x). As shown in FIG. 22, the lower the signal value, the larger the compensation component signal is calculated and the signal is added to the original image signal. Compensation signal adding section 15 adds the compensation signal that was obtained in compensation signal calculating section 14 and obtains a processed image signal by adding the signal to the original image signal.

For this embodiment also, each unsharp image signal can be converted to the function that is shown in FIG. 2. Horizontal axis x represents a signal value that indicates a difference between the signal value before application of unsharp processing and the signal value after application of unsharp processing. This function varies according to the density of the unsharp image signal as shown in FIG. 3. In FIG. 3, horizontal axis x represents signal values that indicate differences and vertical axis y represents compensation component signals.

As described above, by enhancing a compensation component as the density becomes lower, the unsharp image signal becomes an image signal with a high frequency component signal added at a low density area. As a result, the differential image signal no longer contains high frequency component signals in the area equivalent to a low density. Therefore, a low frequency image signal that is obtained by subtracting the differential signal from the original image signal contains a high frequency in a low density section. When the dynamic range of the low frequency image signal is compressed, the high frequency component signal is also compressed and consequently, grain deterioration by dynamic range compression in the low density section can be controlled.

When the pixel value with the image signal one above or with the original image signal is large due to averaging, overshoot/undershoot after processing can be controlled by adding processing for controlling averaging that approximates the pixel value to that of the image signal one above or the original image signal. By enhancing this compensation as the frequency band becomes lower, sharper and better image signals with less artifacts and noise can be obtained.

The averaging adjustment in the low density section described above is not required for all the unsharp image signals. By making the adjustment for only unsharp image signals of comparatively high frequency, noise control and emphasis of edge component signals can be adjusted. The adjustment depending on the density can be varied according to the unsharp image signal. For instance, by enhancing averaging control in the low density section as the frequency of unsharp image signals becomes higher, image signals can be generated by emphasizing the edge portions included in the original image adequately and controlling grain deterioration.

Filter processing section 6 can also be excluded from the configuration shown in FIG. 4, creating another configuration.

In the embodiment excluding filter processing section 6, the compensation section that is added to the original image signal or the super low frequency image signal is adjusted by converting the unsharp image signal, enabling generation of processing image signals by applying both dynamic range compression of image signals and control of noise and artifacts.

Since said differential image signal indicates a difference between two unsharp image signals of a pair of adjacent frequency bands or between an original image signal and a converted unsharp image signal, frequency band overlapping sections of each differential image signal are reduced by producing a difference between adjacent unsharp signals, enabling operation of each band by matching conversion processing to the unsharp image signal.

Since the conversion processing that is applied to the unsharp image signals of said multiple frequency bands converts pixel values of the unsharp image signals, noise and artifacts can be controlled effectively.

Since the conversion processing that is applied to the unsharp image signals of said multiple frequency bands are determined by the original image signal or the unsharp image signals of the multiple frequency bands, processing according to the unsharping tendency of image signals can be performed, enabling more effective control of noise and artifacts.

Since the conversion processing that is applied to the unsharp image signals of said multiple frequency bands are determined by the unsharp image signals of adjacent frequency bands or the original image signal, processing according to the unsharping tendency of image signals can be performed, enabling more effective control of noise and artifacts.

Since the conversion processing that is applied to the unsharp image signals of said multiple frequency bands varies according to the pixel value of the other unsharp image signal that is used for generating said differential image signal or the original image signal, processing according to the pixel before application of unsharping processing can be performed, enabling conversion processing considering higher frequency components signals and consequently enabling more effective edge emphasis and control of artifacts and noise.

Since the conversion processing that is applied to the unsharp image signals of said multiple frequency bands varies according to the said unsharp image signals, adjustments according to the frequency bands can be made, enabling more effective control of noise and artifacts.

Since the conversion processing that is applied to the said unsharp image signals controls averaging of image signals, unsharpness is controlled in the high contrast area, which is the cause of overshoot/undershoot, enabling more effective control of noise and artifacts.

Since the conversion processing that is applied to said unsharp image signals varies according to the pixel values of the unsharp image signals, the processing according to the signal values of the unsharp image signals can be performed, enabling averaging control in the signal area with noticeable noise and thereby enabling more effective control of noise and artifacts.

Since the conversion processing that is applied to said unsharp image signals varies according to the pixel values of the unsharp image signals of the lowest frequency band, conversion variation of the unsharp image signals can follow the major structure of the original image signal.

Since the conversion processing that is applied to said unsharp image signals varies according to the pixel value of the original image signal, conversion variation of the unsharp images can follow the original image signal faithfully.

In the conversion processing that is applied to said unsharp image signals, averaging suppression can be enhanced as the frequency band becomes lower by enhancing the averaging suppression tendency as the frequency band of the unsharp image signals become lower, thereby enabling more effective generation of sharper images with control of noise and artifacts.

Since in the conversion processing that is applied to said unsharp image signals, averaging suppression is enhanced as the frequency band becomes higher, the averaging suppression is more enhanced as a higher frequency band that tends to contain more noise component signals, enabling more effective control of noise and artifacts.

Figure 5:
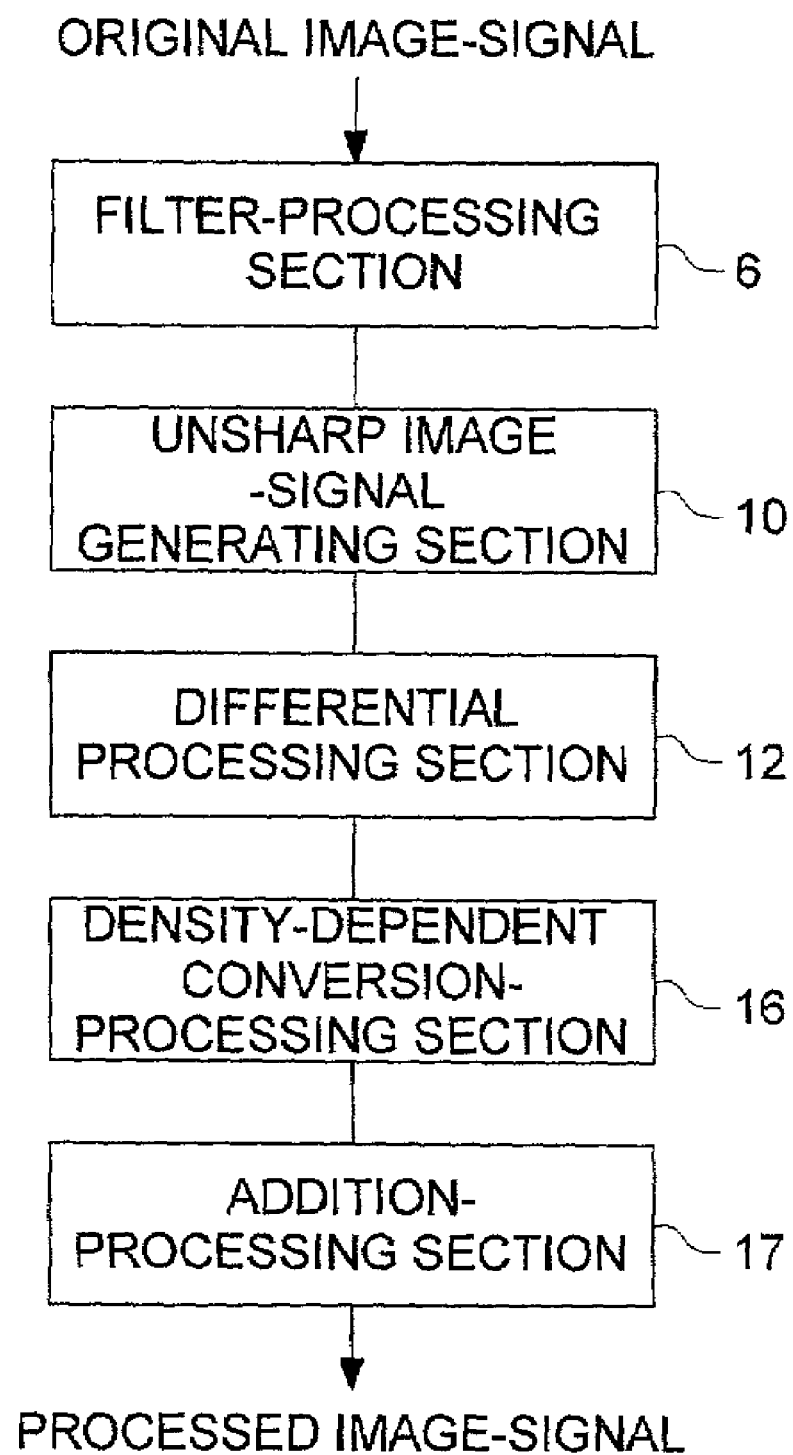
FIG. 5 shows a block diagram of the second embodiment of this invention that performs frequency-emphasizing processing.

This invention enables linear conversion for differential image signals that are a difference between an original image signal and an unsharp image signal and a difference between two unsharp image signals, using the density information of the unsharp image signals or the original image signal. The block diagram in FIG. 5 shows the second embodiment of this invention using frequency emphasizing processing. For the items identical to the items in FIG. 1, the same signs are assigned. The apparatus shown in the diagram configures an image processing apparatus that obtains processed image signals by generating unsharp image signals of multiple frequency bands for an original image consisting of multiple pixels, applying conversion processing for the differential image signals of said differential image signals, and adding to the original image signal or the lowest frequency.

In the diagram, 6 indicates a filtering processing section that applies filtering processing to an original image signal as described above, 10 indicates an unsharp image signal generating section that generates unsharp image signals from an original image signal, 12 indicates a differential processing section that produces a difference between an original image signal and an unsharp image signal and a difference between a pair of two adjacent unsharp image signals, 16 indicates a density-dependent conversion processing section that performs density-dependent conversion processing for the differential image signals that were obtained in said differential processing section 12, 17 indicates an addition processing section that adds the conversion image signal obtained in said density-dependent conversion processing 16. Filter processing section 6, unsharp image signal generating section 10, differential processing section 12, density-dependent conversion processing section 16, and addition processing section 17 can be achieved either by hardware or software. The operation of the apparatus with this configuration is described below.

Filter processing section 6 applies filtering processing as described above after receiving an original image signal. After receiving output from filter processing section 6, unsharp image signal generating section 10 generates unsharp image signals using a pyramid algorithm. Unsharp image signal generating section generates unsharp image signals of multiple frequency bands of different frequency characteristics. Differential processing section 12 obtains a difference between the original image signal and the unsharp image signal that were obtained as described and a difference between a pair of adjacent unsharp image signals.

Figure 6:
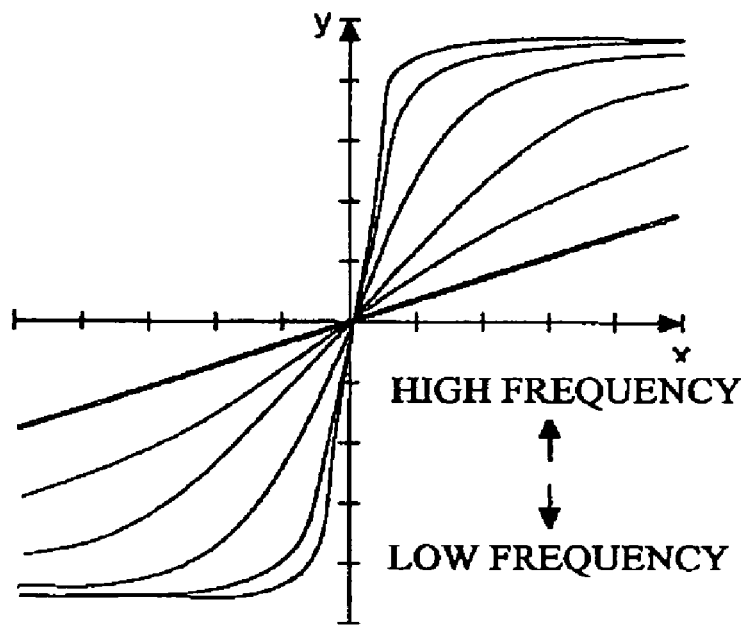
FIG. 6 shows changes of frequencies of conversion functions of differential image signals.
Figure 7:
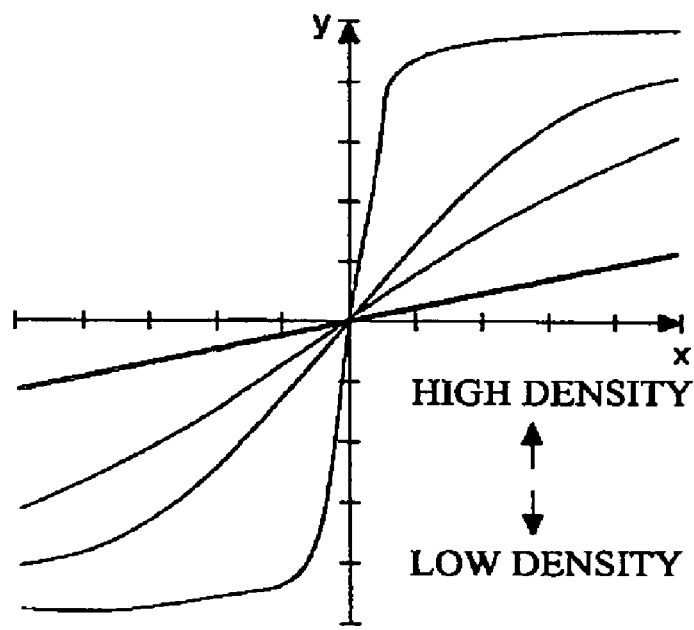
FIG. 7 shows changes of densities of conversion functions of differential image signals.

Density-dependent conversion processing section 16 performs density-depending conversion processing for the differential image signal that is provided from differential processing section 12. FIG. 6 and FIG. 7 illustrate conversion characteristics of density-dependent conversion processing 16 and FIG. 6 illustrates changes of frequencies by the conversion function of differential image signals and FIG. 7 illustrates changes by the density.

In FIG. 6, horizontal axis x is allocated to pixel values that indicate the differences and vertical axis y indicates pixel values of converted differential image signals. In FIG. 7, horizontal axis x is allocated to signal values that indicate the differences and vertical axis y is allocated to pixel values of converted differential image signals. Density-dependent conversion processing section 16 has a function containing both the characteristics shown in FIG. 6 and the characteristics shown in FIG. 7. In FIG. 6, the function that indicates conversion in high frequency characteristics belong to the upper function and the function that indicates conversion in low frequency characteristics belong to the lower function. In FIG. 7 that indicates a conversion function, the upper function indicates the characteristics, whereby unsharp images for generating differential image signals are in a high density and the lower function indicates the characteristics, whereby unsharp images used for generating differential image signals are in a low density.

In this case, since the image size of the differential image signal and the image size of the unsharp image signal match, the pixel value of the unsharp image signal corresponding to the pixel value of the differential image signal can be obtained easily. In this case, in the non-linear function, artifacts such as overshoot and undershoot can be eliminated by suppresing the signals in the section with large differential values as shown in FIGS. 6 and 7. By enhancing supress of differential component signals in sections where the frequency bands and the density become lower, sharper and better image signals can be obtained with less artifacts and noise.

Addition processing section 17 performs addition processing for the signal that was converted as described above. Then, the section adds the addition signal to the original image signal. As a result, by applying density-dependent linear conversion to the differential image signal, the high frequency component signal that is added to the original image signal is adjusted, enabling generation of processing image signals with edge emphasis and control of noise and artifacts.

Figure 8:
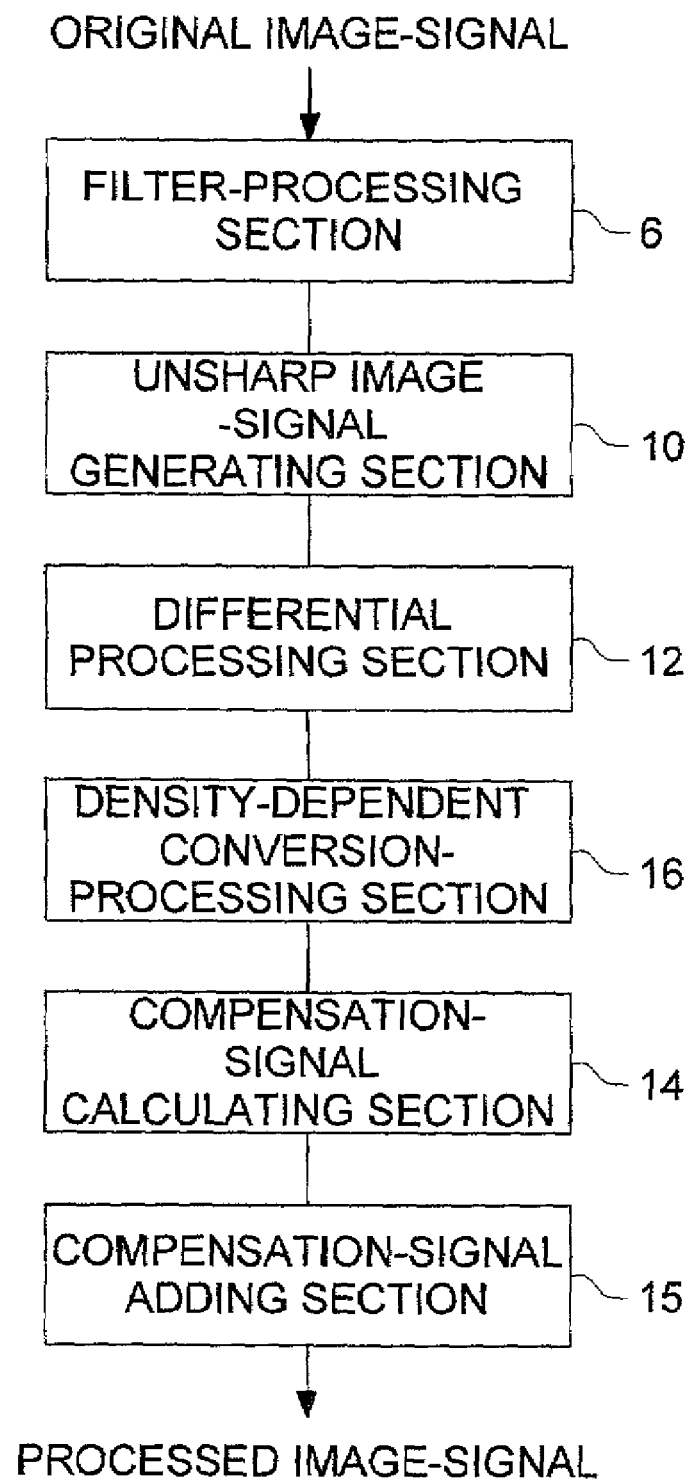
FIG. 8 shows a block diagram of the second embodiment of this invention that performs dynamic range compression processing.

FIG. 8 shows a block diagram of the second embodiment of this invention that uses dynamic range compression processing. For the same items as the items in FIG. 4 and FIG. 5, the same signs in FIG. 4 and FIG. 5 are assigned. The apparatus that is shown in the diagram configures an image processing apparatus that obtains a processed image signal by adding the compensation signal that is obtained from an original image signal to said original image signal consisting of multiple pixels or a low frequency image signal.

In the diagram, 6 indicates a filtering processing section that applies filtering processing to an original image signal as described above, 10 indicates an unsharp image signal generating section that generates unsharp image signals from an original image signal, 12 indicates a differential processing section that produces a difference between an original image signal and an unsharp image signal and a difference between a pair of two adjacent unsharp image signals, 16 indicates a density-dependent conversion processing section that performs density-dependent conversion processing for the differential image signals that were obtained in said differential processing section 12, 14 indicates a compensation signal calculating section that calculates a compensation signal from the high frequency component signal obtained by subtracting from the original image signal the high frequency signal that is obtained by multiplying the conversion image signal that was obtained in the density-dependent conversion processing section 16, 15 indicates a compensation signal adding section that adds the compensation signal that is obtained in the compensation signal calculating section. Filter processing section 6, unsharp image signal generating section 10, differential processing section 12, density-dependent conversion processing section 16, compensation signal calculating section 14, and compensation signal adding section 15 can be achieved by either hardware or software. The operation of the apparatus in this configuration is described below.

Filter processing section 6 applies filtering processing as described above after receiving an original image signal. Unsharp image signal generating section 10 generates unsharp image signals for the original image signal 10, using a pyramid algorithm for instance. Unsharp image signal generating section generates unsharp image signals of multiple frequency bands of different frequency characteristics. Differential processing section 12 obtains a difference between the conversion image signal that was obtained as described above and the original image signal and a difference between a pair of adjacent unsharp image signals.

Density-dependent conversion processing section 16 performs density-dependent conversion processing for the differential image signal that was passed from differential processing section 12. The conversion characteristics that are shown in FIG. 6 and FIG. 7 are used for this section. Compensation signal calculating section 14 calculates a compensation signal from the low frequency component signal that is obtained by subtracting the high frequency component signal that is obtained by multiplying the conversion image signals that were obtained by density-dependent conversion processing 16 from the original image signal. Compensation signal adding section 15 adds the compensation signal that is obtained in this way. A processed image signal is obtained by adding the compensation signal to the original image signal.

According to this embodiment, an adjustment is made to the high frequency component signal that is added to the compensation component signal that is added to the original image signal or the super low frequency image signal by converting the differential image signal and controlling the component signal, and as a result, a processing image signal can be obtained by applying both image signal dynamic compression and control of noise and artifacts.

This invention enables adjustments of more delicate frequency characteristics for processing image signals by changing the mask frequency characteristics. Since said mask processing is specific filter repetition processing, frequency characteristics can be adjusted at a high speed without using multiple filters.

Since the mask of said repetition processing is a simple average, frequency characteristics can be changed at a high speed.

Since the mask of said repetition processing is a simple average of 2 pixels×2 pixels, unsharp image signals can be generated at a higher speed and according to normal distribution.

Frequency characteristics of said processing image signal are specified by the repetition count of said repetition processing, enabling specification of frequency characteristics easily.

Since frequency characteristics of said processing image signal are specified by specifying the weight of the mask used at generation of an unsharp image signal with a variance value of normal distribution, frequency characteristics can be specified easily by performing processing by calculating the mask processing repetition count close to the normal distribution of said specified variance value.

Since said interpolation-processing varies depending on the unsharp image signal, frequency characteristics can be adjusted according to the frequency band. Since said interpolation-processing varies depending on the original image signal, frequency characteristics can be adjusted according to the type of the original image signal, for instance body parts examined.

Since said interpolation-processing varies depending on the frequency characteristics of said original image signal, adjustments are enabled according to the frequency of the original image signal such as suppression of frequency bands with many noise signals.

Since this invention performs addition or subtraction between image signals of different resolution, frequency characteristics of processed image signals can be changed by changing the interpolation-processing method.

In this configuration, more delicate adjustments of frequency characteristics of processed signals can be made by changing the frequency characteristics of interpolation-processing.

In this case, since said interpolation-processing is specific filter repetition processing, frequency characteristics can be adjusted at a high speed without using multiple filters.

Since the mask of said repetition processing is a simple average, frequency characteristics can be adjusted at a high speed.

Since the mask of the repetition processing is a simple average of 2 pixels×2 pixels, interpolation-processing is enable at a high speed according to normalized distribution.

By specifying the frequency characteristics of said processed image signals through the repetition count of said repetition processing, frequency characteristics can be specified easily.

Since said interpolation-processing is based on the sampling function, frequency characteristics of the unsharp image signals can be reproduced more faithfully.

Since said interpolation-processing is linear interpolation-processing is enabled at a thigh speed without making a major change in frequency characteristics of unsharp image signals.

Since said interpolation-processing spline interpolation, smooth interpolation is enabled.

Since said interpolation-processing varies depending on the frequency band of the interpolation of image signal, frequency characteristics can be adjusted for each frequency band.

Since said interpolation-processing varies depending on the original image signal, frequency characteristics can be adjusted according to the type of the original image signal. For instance, frequency characteristics can be adjusted according to the body part.

Since said interpolation-processing varies depending on the frequency characteristics of the original image signal, adjustments can be made according to the frequency characteristics of the original image signal such as suppression of frequency bands with many noise signals.

In this invention, a reduction rate of an unsharp image signal by down sampling of an image signal performed by said pyramid algorithm varies depending on the frequency characteristics of the mask.

By applying this configuration, a processing speed can be increased more efficiently by changing the reduction rate of the image signal through the frequency characteristics of the mask.

In this case, since said mask processing is specific filter repetition processing, processing can be simplified.

Since the mask of said repetition processing is a simple average, the processing speed can be increased. Since the mask of said repetition processing is a simple average of 2 pixels×2 pixels, unsharp image signals can be generated at a high speed according to the normal distribution.

Since said mask processing varies depending on the unsharp image signal, frequency bands can be divided according to the processed image signal.

Since said mask processing varies depending on the original image signal, frequency characteristics can be adjusted according to the type of the original image, for instance, body parts examined.

Since said mask processing varies according to the frequency characteristics of the original image, adjustments can be made according to the frequency characteristics of the original image such as suppress of frequency bands with many noise signals.

Since said differential image signal represents a difference between two unsharp image signals of a pair of adjacent frequency bands or a difference between an original image signal and a converted unsharp image signal, frequency band overlapping sections of each differential image signal are reduced and operation for each band is enabled by employing conversion processing to the image signal.

Since the unsharp image signal on which said conversion processing depends is the image signal used for obtaining the differential image signal, an unsharp image signal of the same image size as the converted image signal can be used when a pyramid algorithm is used also, enabling processing simplification.

Since the conversion processing that is applied to said multiple differential image signals varies depending on the differential image signal, adjustments can be performed according to the frequency band, enabling more effective edge emphasis and control of noise and artifacts.

Since the conversion processing that is applied to said differential image signal controls the absolute value of the pixel value in a part of the image signal, emphasis in a high contrast section, which is the cause of overshoot/undershoot is suppressed, enabling more effective edge emphasis and control of noise and artifacts.

Since in the conversion processing that is applied to said differential image signals, the lower the frequency band of the differential image signal, the greater the suppression of the absolute value of the image signal becomes, suppression of the absolute value increases as the frequency band of the component signal of the differential image signal becomes lower and as a result, sharer and better image signals with less artifacts and noise can be obtained.

Since in the conversion processing that is applied to said differential image signals, the higher the frequency band of the differential image signal, the greater the control of absolute value of the image signal becomes, control of the absolute value increases as the frequency band becomes higher, which tends to contain many noise signals, enabling more effective edge emphasis and control of noise and artifacts. The high-frequency component signal in this invention refers to the signal that is obtained by summing differential image signals.

Figure 9:
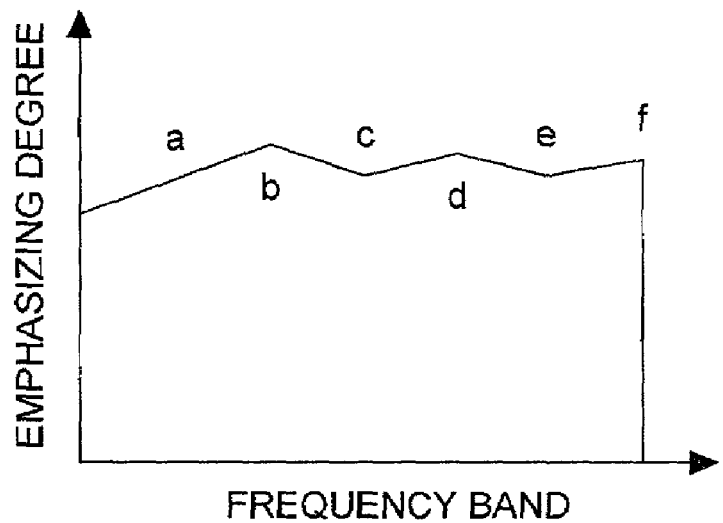
FIG. 9 shows a diagram for specification of frequency characteristics.

The user interface functions that are provided to users are described below. FIG. 9 shows an example of a specification method of frequency characteristics in this invention. In the diagram, the horizontal axis represents frequency bands and the vertical axis represents emphasizing degrees. As shown in FIG. 9, the emphasizing degree of each frequency band is specified by a to f in the diagram. The parameters can be specified using the mouse or entering values. The 'adjacent' that is described in the claim item refers to adjacent images when images containing unsharp image signals or differential image signals are arranged from the highest frequency band. The frequency components that are contained in differential image signals are not separated completely and component signals that are contained may overlap. Alternatively, some frequency bands are not included, and mutually adjacent in terms of a distance.

Figure 10:
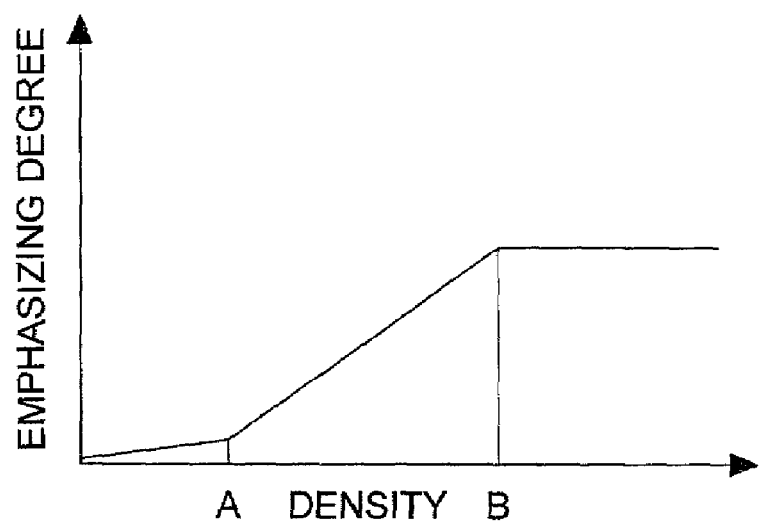
FIG. 10 shows a diagram for specification of density-dependent emphasis.

Emphasizing degrees regarding density can be specified in a graph as shown in FIG. 10. In the graph, the horizontal axis represents densities and the vertical axis represents emphasizing degrees. Frequency characteristics and density emphasizing degrees can be set in each band or by determining the frequency characteristics of the entire area, the relationship between the density and emphasis common to all the frequency bands that are emphasized can be set. In this graph, for instance, emphasizing degrees in A and B are specified.

By specifying frequency characteristics in this way, a conversion function that achieves specified frequency characteristics is determined and processing is performed by said conversion function, and consequently users need simply to specify required frequency characteristics only, without having to be aware of various parameters to be set, enabling processing simplification.

Since said frequency characteristics can be changed according to the density, users can specify processing according to the signal value more easily, such as suppressing noise emphasis by manipulating frequency characteristics of the image signal area corresponding to the density with noticeable noise.

Since said frequency characteristics can be changed according to the density for each unsharp image signal or differential image signal, users can easily set the emphasis of processing according to the image signal value corresponding to the density.

By preparing a set of parameters required for said frequency characteristic processing and selecting the set of parameters, users can select the most suitable parameter set easily without having to handle many parameters.

Through this invention, an image processing apparatus that generates processed image signals by generating multiple unsharp image signals for an original image signal consisting of multiple pixels, applying conversion processing to the differential image signal generated from said unsharp image signals or the original image signal, and adding the compensation signal that is obtained by adding said differential image signal to the original image signal or a lowest frequency image signal or producing a difference of sum of said differential image signals. In this case, specific filter repetition processing for generating said unsharp image signals is repetition of filters. As a result, processing can be simplified.

In this invention, the mask of said repetition processing can be a simple average. By applying this configuration, processing can be simplified and the speed can be increased.

In this invention, the mask of said repetition processing can also be a simple average of 2 pixels and 2 pixels. As a result, effects equivalent to the processing by the weighting mask according to Gaussian distribution can be achieved.

In this invention, said mask processing can be varied according to the unsharp image. As a result, processing can be performed according to the body part.

In this invention, said mask processing can be varied according to the original image signal. As a result, frequency characteristics can be adjusted according to the type of the original image, such as body parts examined.

In this invention, said mask processing can be varied according to the frequency of said original image signal. As a result, processing can be varied according to the frequency of the image signal characteristics such as suppression of frequency bands with many noise signals.

In this invention, said repetition count of simple average of 2×2 can be 16 or more. As a result, the frequency bands that are contained in each unsharp image signal are reduced to about a half of the image signal before application of mask processing, enabling disassembling to an optimum frequency band.

In this invention, said repetition count of simple average of 2×2 can be 8 or more. As a result, the frequency bands contained in each unsharp image signal are reduced to about a half of the image signal before application of mask processing, enabling disassembling to an optimum frequency band.

In the embodiment that is described above, a pyramid algorithm was used as the decomposing method to multi-resolution space. This invention is not restricted to the method only. For instance, a scaling function or Wavelet transformation/inverse transformation can be used. When Wavelet conversion is used, emphasizing processing can be performed in any direction (vertical direction, horizontal direction, or diagonal direction).

Figure 11:
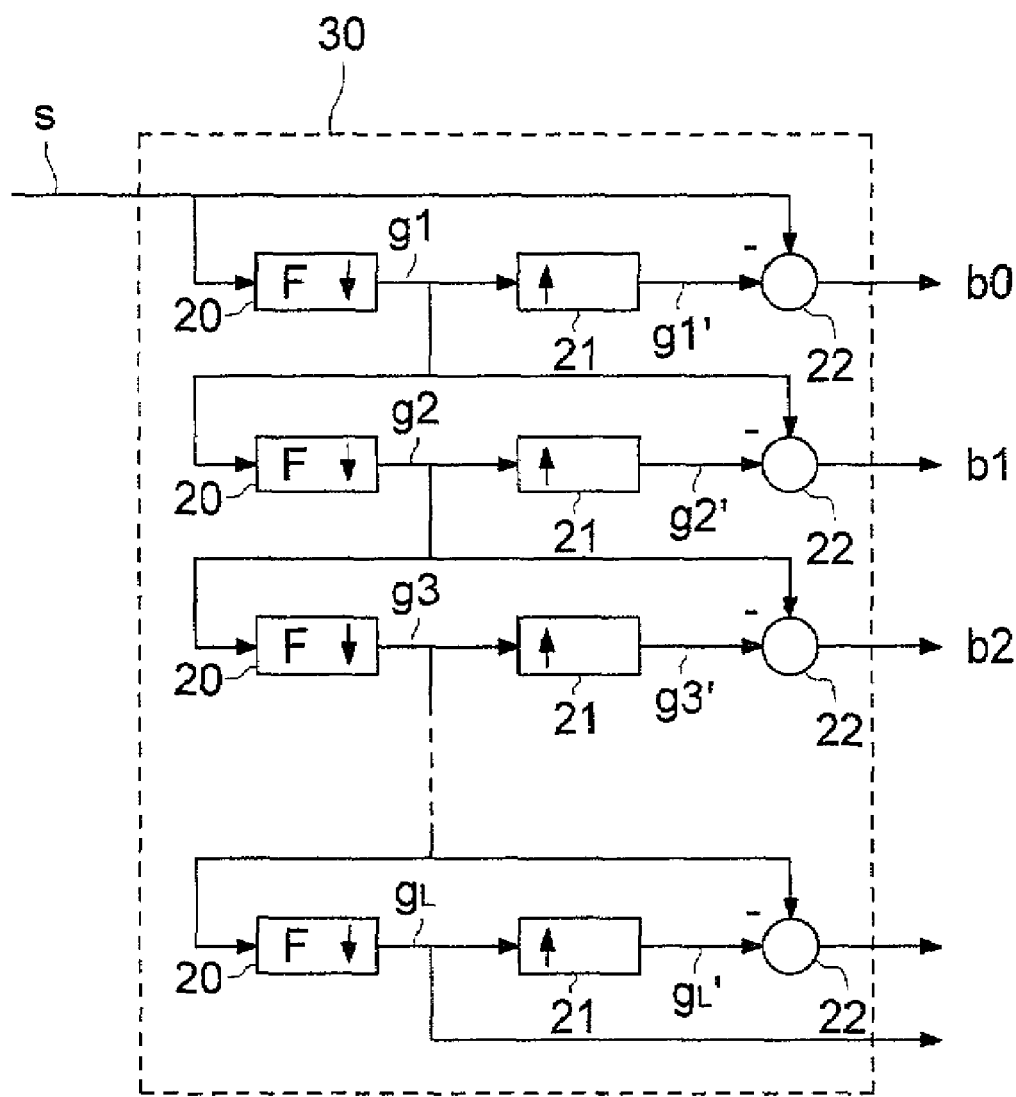
FIG. 11 shows a block diagram of a configuration of a decomposition section that executes a pyramid algorithm.

A pyramid algorithm is described below. FIG. 11 is a block diagram showing a configuration example of a decomposing section that executes a pyramid algorithm. In the diagram, symbol ↑ indicates interpolation-processing, symbol ↓ indicates down sampling, and F indicates filter processing. This sample shows processing for obtaining differential image signals b0 to bL-1.

In the embodiment, conversion processing that is described later is applied to unsharp image signals or differential image signals through a pyramid algorithm. The pyramid algorithm is to generate image signals of the resolution according to the frequency component signal by down-sampling images and to perform processing with the image signals. Therefore, in this invention, varying in the resolution refers to varying in the resolution of the images obtained through the pyramid algorithm.

Figures 12, 13:
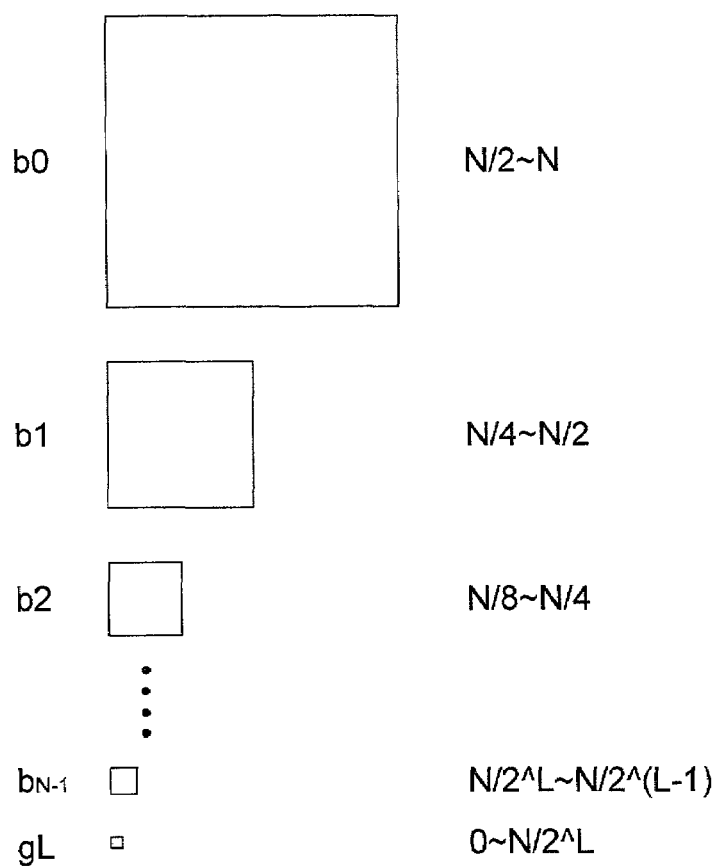
FIG. 12 shows low pass filters.
FIG. 13 shows various sizes of output image signals of a pyramid algorithm section.

As shown in the diagram, when digital image signal S that indicates an original image signal is input in processing method 30, the signal is filtered by low pass filters in filtering method 20. These low pass filters roughly correspond to the two dimensional Gaussian distribution on a 5×5 grid as shown in FIG. 12. Image signal S that is filtered by low pass filters as described above sampled at every second pixel in filtering method 20, generating low resolution approximate image signal g1.

Low resolution approximate signal g1 is ¼ of the original image signal in size. In interpolation method 21, a pixel with value 0 is interpolated at the sampling interval of low resolution approximation image signal g1. This interpolation is performed by inserting a row and column of value 0 at every column and every row of low resolution approximation image signal g1. In this way, since a pixel of value 0 is inserted in every second pixel, changes of the signal value of low resolution approximation image signal g1, which is interpolated with interpolation by pixel of value 0, are not smooth although the image is blurred.

After interpolation is performed as described above, low resolution image signal g1' is obtained by applying filtering processing again for low resolution approximation image g1 through the low pass filters that are shown in FIG. 12. Changes of the signal value of low resolution approximation image signal g1' are smoother than low resolution approximation image signal g1 that was interpolated as described above.

Instead of using low pass filters after applying interpolation of 0 as described above, interpolation-processing can be performed by initially applying linear interpolation, spline interpolation, or interpolation-processing by weighting according to the sampling function and applying the same processing subsequently.

In comparison to the original image signal, the image signal appears in such a way where the frequencies higher than the half way is eliminated. This is because the image size is reduced to ¼, interpolation is applied with a pixel of value 0 for every second pixel, and filtering processing is applied through the flow pass filters that are shown in FIG. 12, creating the condition where the image of the frequency bands whose spacial frequency is higher than the half way is blurred by the Gaussian function.

Low resolution approximation image signal g1' is subtracted from the original image signal by subtracter 22, generating differential image signal b0. This subtraction is performed between the original image signal and low resolution approximation image signal g1' regarding mutually corresponding pixels. Here, for low resolution approximation signal g1', the image of frequency bands higher than the half way of the space frequencies of the original image signal is blurred, differential image signal b0 is an image signal that indicates only the frequency bands higher than the half way among the original image signals. That is, differential image signal b0 indicates the image signal of frequency bands N/2 to N among Nyquist frequency N of the original image signal as shown in FIG. 13.

Low resolution approximation image signal g1 is input to filtering method 20 and is processed by filtering processing by low pass filters that are shown in FIG. 12. After being processed by filtering processing, low resolution approximation image signal g1 is sampled at every second pixel in filtering method 20 and as a result, low resolution approximation image g2 is obtained. Low resolution approximation image signal g2 is ¼ of low resolution approximation image signal g1 in size, that is, ¹⁄₁₆ of the original image signal.

In interpolation method 21, a pixel with value 0 is interpolated at the sampling interval of low resolution approximation signal g2. This interpolation is performed by inserting a row and a column of value 0 in every column and row of low resolution approximation signal g2. In this way, since low resolution approximation image signal g2 with pixels of value 0 interpolated is blurred, changes of the signal value are not smooth since a pixel of value 0 is inserted at every second pixel.

As shown in FIG. 12, after application of interpolation, low resolution approximation image signal g2' is obtained by applying filtering processing again to low resolution approximation image signal g2. Changes of the signal value of low resolution approximation image signal g2' are smoother than the those of low resolution approximation image signal g2 that was interpolated. In comparison to low resolution approximation image signal g1, the image signal of frequency bands higher than the half way appears to have been eliminated.

In subtracter 22, low resolution approximation image signal g2' is subtracted from low resolution approximation image signal g1 and as a result differential image signal b1 is obtained. This subtraction is performed between low resolution approximation signal g1 and low resolution approximation image filter g2' for mutually corresponding pixels. As described above, for low resolution approximation image signal g2', since the image of the frequency bands higher than the half way of the space frequencies of low resolution approximation image signal g1 is blurred, differential image signal b1 represents only the frequency higher than the half way among the frequency bands of low resolution approximation image signal g1.

That is, as shown in FIG. 13, differential image signal b1 indicates only the frequency bands higher than the half way of the frequency bands of low resolution approximation image signal g1, that is an image signal of frequency bands from N/4 to N/2 among the Nyquist frequency N of the original image signal. In this way, differential image signals are obtained by applying filtering processing through low pass filters of Gaussian distribution. Since the image signal with filtering processing applied is subtracted from a low resolution approximation image signal, practically the same result as for applying filtering processing through Laplacian filters is achieved.

As shown in FIG. 13, by repeatedly processing low resolution approximation image signal gk (k=0 to L−1) that was generated by filtering and sampling in method 20 the result obtained by the processing described above, n number of differential signal bk (k=0 to L−1) and residual signal gL of the low resolution approximation image signal are obtained. The resolution of differential image signal bk deteriorates gradually starting from b0. That is, the frequency bands of the image signal become lower and differential image signal bk indicates frequency bands of $N/2^{k+1}$ to $N/2^k$ for Nyquist frequency N of the original image signal and the image size becomes $½^{2k}$ of the size of the original image.

That is, the size of differential image signal b0 with the highest resolution, is the same as the original image signal and the size of differential image signal b1 with the second highest resolution following differential image signal b0 is ¼ of the size of the original image signal. In this way, since sizes of differential image signals become smaller starting form the same size as the size of the original image signal and differential image signals are practically the same image signals that are generated by applying Laplacian filters, multiple resolution conversion in this embodiment is also referred to as a Laplacian pyramid algorithm.

Residue image signal gL can be assumed to be an approximation image signal, which is an original image signal with extremely low resolution and in an extreme case, residue image signal gL (equivalent to a lowest frequency image signal, which is the result generated by executing a pyramid algorithm for the original image signal and applying the final filer processing of multiple times of filter processing performed) consists of only one image signal that represents an average value of the original image signal. Differential image signal bk that is obtained in this way is stored in the memory that is not shown in the diagram. The image signal conversion processing in this invention as described above is performed for g1', g2', g3' . . . , which are the output of interpolation method 21 that is shown in FIG. 11. Alternatively, the image signal conversion processing is performed for b0, b1, b2, . . . These unsharp image signals, g1', g2', g3' . . . , are nusharp image signals of multiple frequency bands of different frequency characteristics. This invention performs the image processing using these unsharp image signals as described above.

The following method may also be used instead of using 0 interpolation and low pass filters. Initially, linear interpolation, spline interpolation, or interpolation-processing by weighting according to the cardinal sign (sampling function) is performed for columns and the same processing is performed for rows.

Inverse transformation is performed for differential image signal bk that is processed by image conversion processing by this invention and differential image signals of other frequency bands. An example of inputting signals b0 to bL−1 is shown here.

Figure 14:
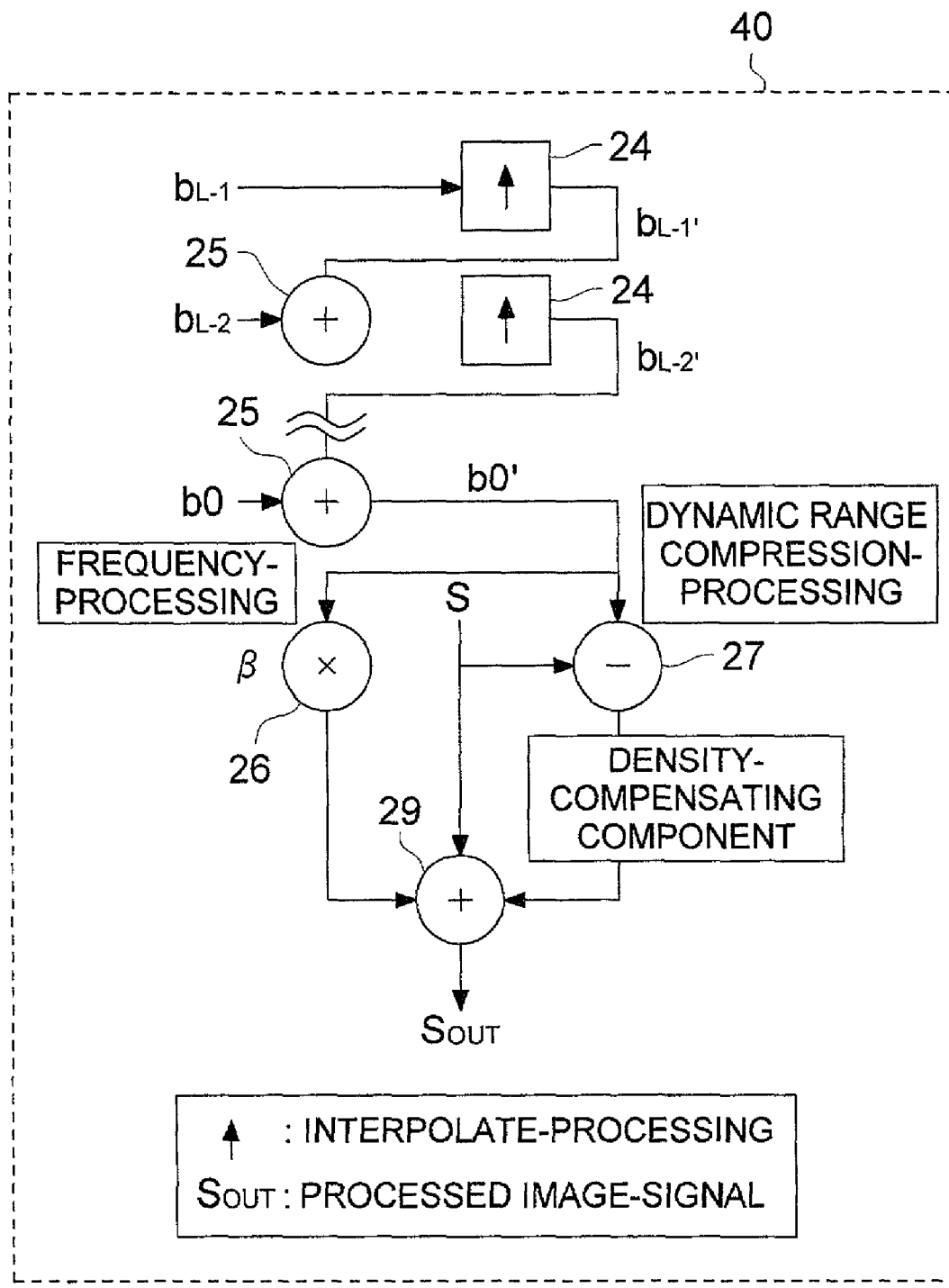
FIG. 14 shows a block diagram of a configuration example of the restruction section that executes a pyramid algorithm.

This inverse transformation is performed in reconstruction processing method 40. FIG. 14 is a block diagram that shows an example of the configuration of the restoration section that executes a pyramid algorithm. Initially, image signal bL−1 is converted to image signal bL−1', which is 4 times of the size of the original size by applying interpolation between each pixel in interpolation method 24. Then, addition image signal (bL−1'+bL−2) by performing addition of corresponding pixels between interpolated image signal bL−1' and differential image signal bL−2.

Addition image signal (bL−1'+bL−2) is input to interpolation method 24 and interpolation is applied to each pixel in interpolation method 24, generating image signal bL−2', which is 4 times the size of the original size. For image signal bL−2', by adder 25, addition processing is performed for mutually corresponding pixels with differential image signal bL−3, which has resolution one method higher than that of differential image signal bL−2, interpolation is applied to an interval of each pixel of added signal (bL−2'+bL−3'), generating image signal bL−3', which is 4 times the size of that of differential image signal bL−3.

Same processing is repeated subsequently. By applying this processing to differential image signals of higher frequency bands sequentially, finally the processing image signal Sout is obtained (frequency emphasizing processing) by multiplying the result of addition of interpolation image signal b1', and differential image signal b0 of the highest resolution through adder 25 by β with multiplier 26, adding the result to original image signal S with adder 29. Alternatively, processed image Sout is obtained (dynamic range compression processing) by adding a density compensation to the result of subtraction of b0' from original image signal S and adding the result to original image signal S by adder 29.

Processed image signal S' that was obtained in this way is input to an image signal output method and is displayed as a visual image. This image signal output method may be a display method such as CRT. The method may also be a storage apparatus that performs optical scan recording on a sensitized film.

In the embodiment, a pyramid algorithm was used as the disassembly method to multiple resolution space, however, other algorithms may also be used. For instance, a scaling function or Wavelet conversion/inverse transformation may be used. When Wavelet conversion is used, emphasizing processing can be performed for any direction (vertical direction, horizontal direction, or diagonal direction).

In the embodiment that was described above, the conversion function varies according to the density of the unsharp image signal to be converted. The conversion function may be an unsharp image signal or an original image signal in the lowest frequency band.

This invention is related to configuration of filtering method 20 or interpolation method 21 that executes a pyramid algorithm as descried above. This invention may also use simple average filters (binomial filters) of 2×2. When a simple average filter is applied to an image signal repeatedly, the weight of the filter becomes close to that of Gaussian distribution. By using this factor, unsharp image signals can be generated in frequency processing at a high speed and easily. By changing the number of times filter processing is performed, frequency characteristics can be adjusted easily.

By manipulating filter frequency characteristics, more delicate frequency manipulations of processing images are enabled.

Figure 15:
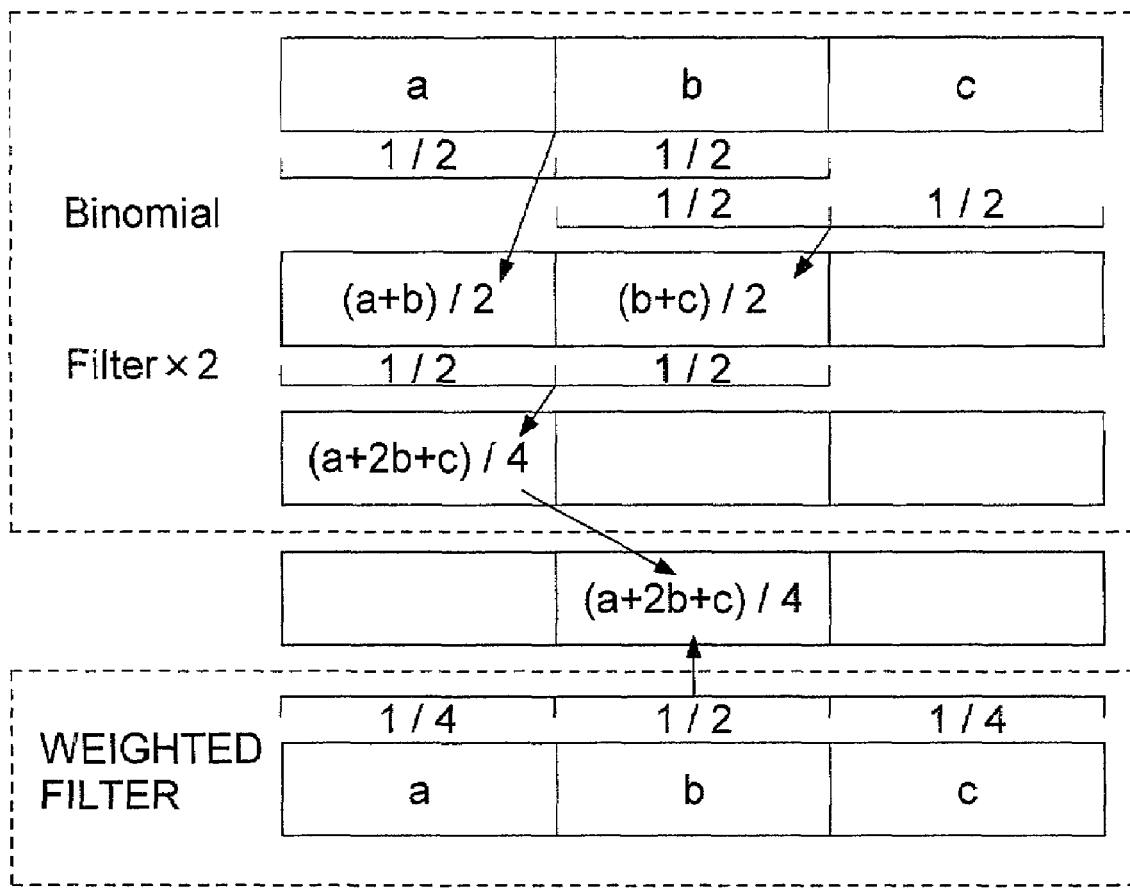
FIG. 15 shows a filter processing.

The concept of filtering processing in this invention is described below. FIG. 15 illustrates filtering processing. Here, filtering processing by one-dimensional filters is explained. Initially, weighting filters that are shown at the bottom of the diagram are discussed. As show in the diagram, filter coefficients are ¼, ½, and ¼. Application of these filters to pixels a, b, and c, will be represented as (¼)×a+(½)×b+(¼)×c and the operation result will be (a+2b+c)/4.

Application of simple filters of weighting coefficients ½ and ½ to pixels a, b, and c is represented as (½)×(a+b) and (½)×(b+c) respectively in the first operation. Application of simple average ½ and ½ these values is represented as (a+2b+c)/4. This result matches the value produced at the first operation performed using weighting filters ¼, ½, and ¼. The above result indicates that repeated operation of simple average filters fluctuate weighting, producing a non-simple-average weighting value.

Figure 16:
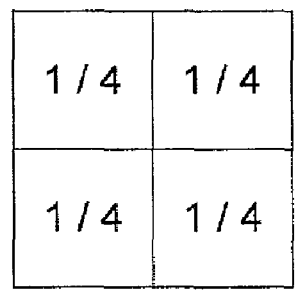
FIG. 16 shows 2×2 simple average filters.
Figures 17, 18, 19:
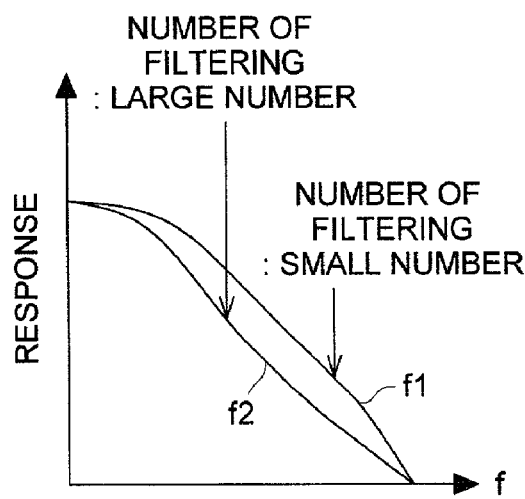
FIG. 17 shows a relationship between distribution of simple average filter repetition count 8 and Gaussian distribution.
FIG. 18 shows mask examples.
FIG. 19 shows an explanatory illustration for a number of filtering and responses.
Figure 20:
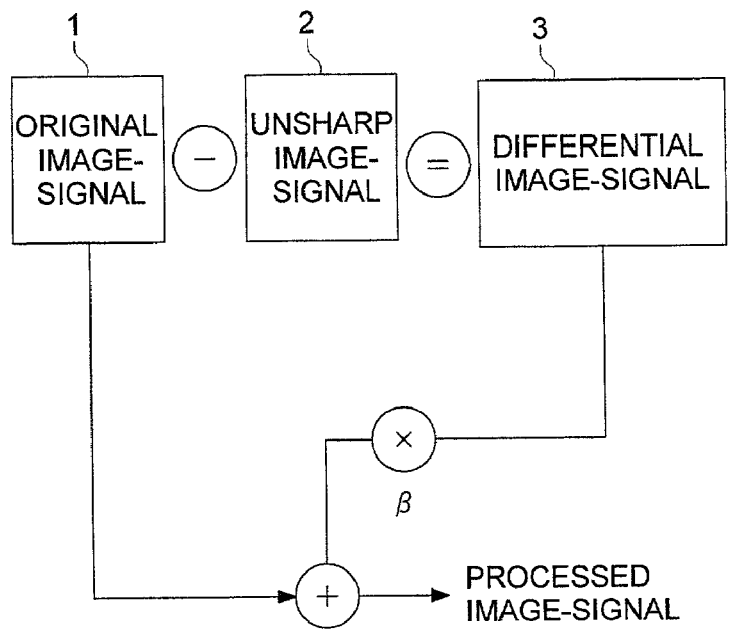
FIG. 20 shows an explanatory illustration of a conventional frequency emphasizing processing.
Figure 21:
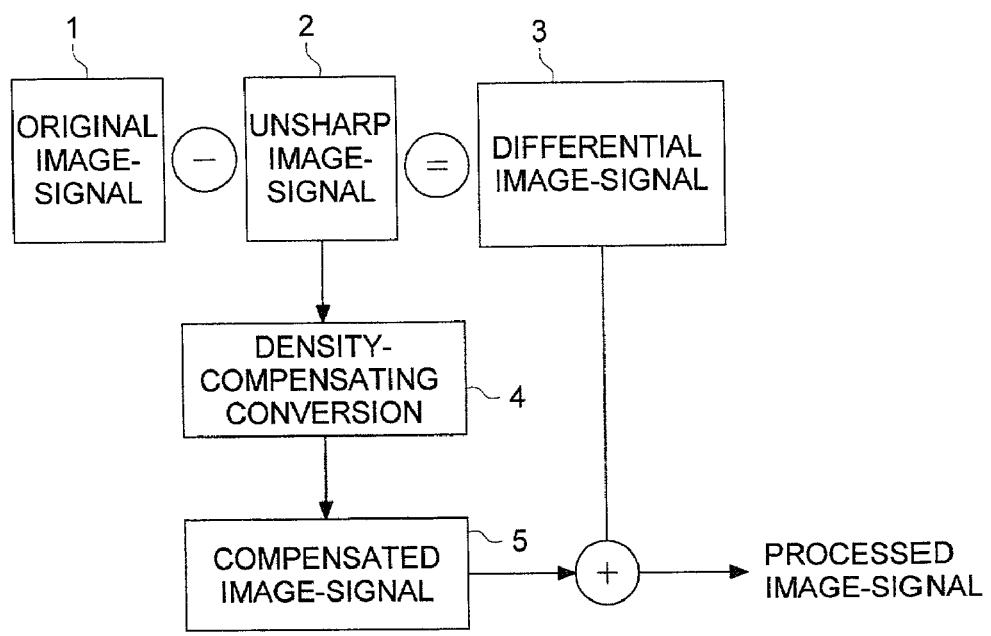
FIG. 21 shows an explanatory illustration of a conventional dynamic range compression processing.

FIG. 16 shows a simple average filter of 2×2. As shown in the diagram, the weight of each value is ¼, indicating that the filter is a simple average. After the simple average filter is repeated multiple times, the weight becomes no longer a simple average. FIG. 17 shows the relationship (condition in which normalization is not performed) between distribution of 8 simple average filter repetitions and Gaussian distribution. The upper row contains filter weights after 8 repetitions of simple average and the lower row indicates Gaussian distribution when variance value=2. The comparison between the values in the upper rows and the values in the lower row indicates that the weight coefficients indicate the values close to Gaussian distribution.

In this invention, by using repeatedly a simple average filter that is shown in FIG. 16, high-speed filtering processing can be performed in comparison to the case where conventional weighting filters are used and processing can be performed at a high speed also for the algorithm that requires filtering processing in multiple times such as a pyramid algorithm. When a mask needs to be changed to change frequency characteristics in the conventional method, in this invention, frequency characteristics can be changed simply by changing the number of times filtering is performed for a simple average filter. That is, by specifying a simple average repetition count, frequency characteristics can be manipulated.

Assuming that the mask used is a simple average of 2×2 as shown in FIG. 16, unsharp image signals can be generated by applying this filter repeatedly. This mask has a feature of becoming rapidly close to a Gaussian mask as the application increases. For instance, two applications of this mask is equivalent to application of the mask with the weighting as shown in FIG. 18.

As the mask application count increases, averaging increases, consequently, generating frequency characteristics of the unsharp image signal with the high frequency bands truncated. FIG. 19 illustrates the relationship between the number of filtering stages and the response. The vertical axis represents frequency f and the horizontal axis represents response. When the number of filtering stages is low, the characteristics represented by f1 are shown. When the number of filtering stages is high, the characteristics represented by f2 are shown. When the number of filtering stages is high, high frequency component signals are truncated, lowering the frequency characteristics.

In a pyramid algorithm, interpolation-processing is performed to reconstruct an image size. In this case, the closer the shape of the filter used for interpolation-processing to a cardinal sign function (sampling function or sinc function), the closer the frequency characteristics of the interpolated image signal becomes to the frequency characteristics of the pre-interpolation image signal. For instance, if the interpolation-processing is simple interpolation, the pre-interpolation image signal has frequency characteristics with high frequencies truncated. By combining these types of processing, delicate adjustments are enabled for frequency characteristics of differential image signals.

By changing a down sampling rate of an image signal by changing frequency characteristics of an unsharp image signal through a mask change, and changing the number of frequency segments through an image signal, adjustments such as reduction of the number of segments according to the image signal are enabled, simplifying processing.

By adjusting the contents of each mask processing such as number of filtering stages, the processing time can be easily reduced and a processing algorithm can be structured easily considering both the picture quality and the processing time.

According to the present invention, the following effects could be attained.

(1) Since said high-frequency component signal is obtained that by adding a differential image signal obtained by applying conversion processing to unsharp image signals of multiple frequency bands that are generated from said original image signal and adding a difference between said unsharp image signal and said converted image signal, a differential image signal that is added to an original image signal is adjusted by converting an unsharp image signal and, consequently, a processing image signal can be created with controlling noise and artifacts together with an edge emphasis.

(2) Since said differential image signals derive from either differences between said unsharp image signals in adjacent pairs of frequency bands or differences between said original image signal and said converted unsharp image signals, frequency band overlapping sections of differential image signals are reduced by taking differences between adjacent pairs of unsharp image signals and by applying conversion processing to said unsharp image signals, operation in band units is enabled.

(3) Since said conversion processing applied to said unsharp image signals of said multiple frequency bands converts pixel values of said original image signals of said unsharp image signals based on non-linear conversion, edge emphasis and control of noise and artifacts are enabled by performing non-linear conversion.

(4) Since conversion processing that is applied to unsharp image signals of said multiple frequency bands is determined by said original image signal or said unsharp image signals of said multiple frequency band, processing depending on an unsharp tendency of image signals can be performed, and consequently, effective edge emphasis and noise and artifacts control are enabled.

(5) Since said conversion processing applied to said unsharp image signals of said multiple frequency bands is determined by said unsharp image signals in adjacent pairs of frequency bands or said original image signal, processing depending on an unsharp tendency of image signals can be performed, and consequently, effective edge emphasis and noise and artifacts control are enabled.

(6) Since said conversion processing that is applied to said unsharp image signals of said multiple frequency bands varies according to a pixel value of either one of said unsharp image signals or said original unsharp image signal that is used for generating said differential image signals, processing depending on pixels prior to unsharp processing can be performed, enabling conversion with more consideration to high frequency component signals, and consequently, more effective edge emphasis and suppress of artifacts and noise are enabled.

(7) Since said conversion processing that is applied to said unsharp image signals of said multiple frequency bands vary according to said unsharp image signals, adjustments depending on frequency bands can be made and more effective edge emphasis and suppress of noise and artifacts are enabled.

(8) Since said conversion processing that is applied to said unsharp image signals suppress averaging of image signals, unsharpness is suppressed in a high contrast area, which is a cause of overshoot/undershoot and consequently, effective edge emphasis and control of noise and artifacts are enabled.

(9) Since said conversion processing that is applied varies depending on pixel values of said unsharp image signals to be processed by said conversion processing, processing depending on signal values of unsharp image signals become possible and by enhancing control of artifacts of signals with noticeable noise (density), more effective edge emphasis and control of noise and artifacts are enabled.

(10) Since said conversion processing that is applied to said unsharp image signals varies depending on pixel values of said unsharp images at lowest frequency band, changes of conversion of unsharp image signals may follow a major configuration of an original image signal.

(11) Since said conversion processing that is applied to said unsharp image signals varies depending on pixel values of said original signal, changes of conversion of unsharp images may follow an original image signal faithfully.

(12) Since a degree of averaging control of said conversion processing that is applied to said unsharp image signals increases as frequency bands of said unsharp images become lower, a degree of averaging suppression increases as frequency bands become lower and consequently, image signals of higher quality may be obtained.

(13) Since a degree of averaging control of said conversion processing that is applied to said unsharp image signals increases as frequency bands of said unsharp image signals become higher, averaging suppression increases for high frequency component signals that tend to contain many noise component signals and consequently effective edge emphasis and control of noise and artifacts are enabled.

(14) Since compensation signals are obtained by applying conversion processing to unsharp image signals of multiple frequency bands that are generated from said original signal, generating high-frequency image signals that are obtained adding differential image signals that are obtained by differences between said unsharp image signals and said image signals generated after said conversion processing, and obtaining differences of said low frequency image signals from results of conversion of low frequency image signals that are obtained from differences between said high frequency image signals and said original image signal, a compensation section that is added to an original image signal or super low frequency image signal, processing image signals can be generated by applying both image signal dynamic range compression and control of noise and artifacts.

(15) Since said conversion processing varies depending on pixel values of said unsharp image signals, emphasis of bands containing many noises in signal areas where noises are noticeable can be controlled by adjusting differential image signals that are added to an original image signal or lowest frequency band image signals, depending on signal values of unsharp images and consequently, more effective edge emphasis and control of noise and artifacts are enabled.

(16) Since said differential image signal indicate a difference between unsharp image signals of a pair of adjacent frequency bands or a difference between an original image signal and a converted unsharp image signal, a frequency band overlapping section of each differential signal is reduced by determining a difference between a pair of adjacent image signals and operation by band units is enabled by employing conversion processing to unsharp image signals.

(17) Since said unsharp image signal on which said conversion processing depends is said image signals used when said differential signals were obtained, an unsharp image signal of an image size identical to a converted image signal can be used when a pyramid algorithm is used also and consequently, processing can be simplified.

(18) Since conversion processing that is applied to said multiple differential image signals varies depending on said differential image signals, adjustments depending on frequency bands are enabled and consequently more effective edge emphasis and control of noise and artifacts are enabled.

(19) Since conversion processing that is applied to said differential image signals absolute values of pixel values in at least some image signals, emphasis on a high contrast area, which is a cause of overshoot/undershoot is suppressed and consequently, more effective edge emphasis and control of noise and artifacts are enabled.

(20) Since control of absolute values of image signals by conversion processing that is applied to said differential image signals increases as frequency bands of said differential image signals become lower, the lower the frequency band in the differential image signal, the greater the control of the absolute value becomes, enabling generation of sharper image signals with control of noise and artifacts more effectively.

(21) Since control of absolute values of image signals by conversion processing that is applied to said differential image signals increase as frequency bands of said differential image signals become higher, suppression over absolute values increases as a frequency band that tends to contain many noise component signals becomes high and consequently, more effective edge emphasis and suppression of noise and artifacts are enabled.

(22) Since a conversion function that actualizes given frequency characteristics is determined by specifying frequency characteristics and processing is performed by said conversion function that was determined, users only need to specify required frequency characteristics without having to be aware of various parameters to be set and consequently, processing is simplified.

(23) Since specification of said frequency characteristics can be changed according to a density, users can easily specify processing depending on signal values such as suppression of noise emphasis by operating frequency characteristics of signal areas containing noticeable noise.

(24) Since specification of said frequency characteristics can be changed depending on a density for each of unsharp image signals or differential image signals, users can easily set an intensity of processing depending on signal values for each frequency band.

(25) Since a set of parameters is specified in said frequency characteristic processing and processing can be specified by selecting said set of parameters, users can select an optimum parameter set easily without manipulating many parameters.

(26) Since frequency characteristics of processing image signals are changed by changing mask frequencies used for mask processing for generating said unsharp image signals, more delicate frequency characteristic adjustments are enabled for processing images by changing mask frequency characteristics.

(27) Since said mask processing is specific filter repetition processing, frequency characteristics can be adjusted at high speed without using multiple filters.

(28) Since a mask of said repetition processing is a simple average, frequency characteristics can be adjusted at high speed.

(29) Since a mask of said repetition processing is a simple average of 2 pixels×2 pixels, unsharp image signals can be generated at high speed and also according to normal distribution.

(30) Since frequency characteristics of said processing image signals are specified by a processing repetition count of said repetition processing, frequency characteristics can be specified easily.

(31) Since frequency characteristics of said processing image signals are specified by designating a weight of a mask at generation of unsharp image signals using a variance value of normal distribution and processing is performed by calculating said mask processing repetition count approximating with normal distribution of said variance value that was specified, frequency characteristics can be specified easily.

(32) Since said mask processing varies depending on said unsharp image signal, frequency characteristics may be adjusted according to a frequency band.

(33) Since said mask processing varies depending on an original image signal, frequency characteristics may be adjusted according to a type of an original image signal, for instance, body parts examined.

(34) Since said masking processing varies depending on frequency characteristics of said original image signal, adjustments according to frequency characteristics of an original image signal are enabled for suppressing frequency bands with excessive noise.

(35) Since frequency characteristics of image processing signals are changed by a changing interpolate-processing method for addition or subtraction of said image signals of different resolutions, more delicate frequency characteristic adjustments of processing image signals are enabled by changing frequency of interpolation-processing.

(36) Since said interpolation-processing is performed based on a sampling function of an original image signal, frequency characteristics of unsharp image signals can be reproduced more faithfully.

(37) Since said interpolation-processing performs linear interpolation, processing can be preformed at a high speed without making major changes in frequency characteristics of unsharp image signals.

(38) Since said interpolation-processing is spline interpolation, smooth interpolation is achieved.

(39) Since said interpolation-processing varies depending on frequency bands of interpolation image signals, frequency characteristics may be adjusted for each frequency band.

(40) Since said interpolation-processing varies depending on an original image signal, frequency characteristics may be adjusted according to a type of an original image signal, for instance body parts examined.

(41) Since said interpolation-processing varies according to frequency characteristics of an original image signal, adjustments may be made according to frequency characteristics of an original image signal such as suppression of frequency bands with many noise signals.

(42) Since unsharp image signals are generated by mask processing through said pyramid algorithm and a reduction rate of unsharp image signals by down sampling changes according to frequency characteristics, a processing speed may be increased efficiently by changing a reduction rate of image signals through frequency characteristics of a mask.

(43) Since said mask processing varies depending on unsharp image signals, frequency characteristics may be adjusted according to a frequency band.

(44) Since said mask processing varies depending on an original image signal, frequency characteristics may be adjusted according to a type of an original image, for instance, body parts examined.

(45) Since said mask processing varies depending on frequency characteristics of an original image signal, adjustments may be made according to frequency characteristics of an original image signal such as controlling of frequency bands with many noise signals.

(46) Since changes of said frequency characteristics of a mask or changes of interpolation-processing are determined by specified frequency characteristics, users may easily generate image signals of required frequency characteristics by determining characteristics of filters from said frequency characteristics.

(47) Since specification of said frequency characteristics may be changed according to a density of an original image signal or an unsharp image signal, frequency characteristics may be adjusted effectively such as suppression of emphasis on signal areas where noise is noticeable.

(48) Since specification of said frequency characteristics may be changed according to a density of an original image signal or an unsharp image signal for each of said unsharp image signals or a differential image signal, frequency characteristics may be adjusted efficiently such as controlling of emphasis of signal areas where noise is noticeable in a frequency area containing many noise signals.

(49) Since the image processing apparatus retains a set of parameters required for processing said frequency characteristics, wherein processing is specified by selecting said set of parameters, users may achieve optimum processing by specifying a set of parameters without setting detailed parameters.

(50) Since filtering processing for generating said unsharp image signals is repetition of specific filters, processing may be simplified.

(51) Since a mask of said repetition processing is a simple average, processing may be simplified and a processing speed may be increased.

(52) Since a mask of said repetition processing is a simple average of 2 pixels×2 pixels, effects equivalent to those achieved from processing by a weighting mask according to Gaussian distribution may be obtained.

(53) Since said mask processing varies depending on an unsharp image, frequency characteristics may be adjusted according to a frequency band.

(54) Since said mask processing varies depending on an original image signal, frequency characteristics may be adjusted according to a type of an original image, for instance, body parts examined.

(55) Since said mask processing varies depending on frequency characteristics of said original image signal, processing may be varied according to frequency characteristics of an original image signal such as suppression of frequency bands containing many noise signals.

(56) Since a repetition count of said single average of 2×2 is 16 or greater, frequency band areas contained in each unsharp image signal are reduced to about a half of frequency bands before application of mask processing, enabling disassembly to an optimum frequency band.

(57) Since a repetition count of said simple average of 2×2 is 8 or greater, frequency bands contained in each unsharp image signal are reduced to about a half of frequency band before application of mask processing, enabling disassembly to an optimum frequency band.

Disclosed embodiment can be varied by a skilled person without departing from the spirit and scope of the invention.

What is claimed is:

1. An image-processing apparatus, in which a high-frequency component signal of an original image-signal, representing a plurality of pixels, is added to either said original image-signal or a lowest frequency image-signal of said original image-signal, in order to generate a processed image-signal, comprising:
   a conversion-processing section to apply a conversion-processing to unsharp image-signals, generated from said original image-signal in respect to a plurality of frequency bands, so as to generate converted unsharp image-signals;
   a differential processing section to generate differential image-signals, obtained from differences between said unsharp image-signals and said converted unsharp image-signals; and
   an addition-processing section to totally add said differential image-signals to generate said high-frequency component signal of said original image-signal.

2. The image-processing apparatus of claim 1,
   wherein said conversion-processing is to convert pixel values of said unsharp image-signals, based on a non-linear transform.

3. The image-processing apparatus of claim 1,
   wherein said conversion-processing is determined by said original image-signal or said unsharp image-signals in said plurality of frequency-bands.

4. The image-processing apparatus of claim 1,
   wherein said conversion-processing is determined by said original image-signal or said unsharp image-signals in adjacent pairs of frequency-bands.

5. The image-processing apparatus of claim 1,
wherein said conversion-processing varies depending on either one of pixel value of said unsharp image-signals employed for generating said differential image-signals or pixel values of said original image-signal.

6. The image-processing apparatus of claim 1,
wherein said conversion-processing varies depending on said unsharp image-signals.

7. The image-processing apparatus of claim 1,
wherein said conversion-processing is a suppression-processing for suppressing an averaging-processing for averaging image-signals.

8. The image-processing apparatus of claim 7,
wherein the lower a frequency-band in which said unsharp image-signals reside is, the greater a degree of suppressing said averaging-action for averaging said image-signals in said suppression-processing is.

9. The image-processing apparatus of claim 7,
wherein the higher a frequency-band in which said unsharp image-signals reside is, the stronger a power of suppressing said averaging-action for averaging said image-signals in said suppression-processing is.

10. The image-processing apparatus of claim 1,
wherein said conversion-processing varies depending on pixel values of said unsharp image-signals to be processed by said conversion-processing.

11. The image-processing apparatus of claim 1,
wherein said conversion-processing varies depending on pixel values of an unsharp image-signal at a lowest frequency-band.

12. The image-processing apparatus of claim 1,
wherein said conversion-processing varies depending on pixel values of said original image-signal.

13. An image-processing apparatus, in which a compensation-signal generated from a low-frequency component signal of an original image-signal, representing a plurality of pixels, is added to either said original image-signal or a lowest frequency image-signal of said original image-signal, in order to generate a processed image-signal, comprising:
a conversion-processing section to apply a conversion-processing to unsharp image-signals, generated from said original image-signal in respect to a plurality of frequency bands, so as to generate converted unsharp image-signals;
a differential processing section to generate differential image-signals, obtained from differences between said unsharp image-signals and said converted unsharp image-signals; and
a compensation-signal calculating section to totally add said differential image-signals so as to generate a high-frequency component signal, and to calculate said compensation-signal by subtracting said low-frequency component signal from a converted low-frequency component signal, which is derived from a difference between said high-frequency component signal and said original image-signal.

14. The image-processing apparatus of claim 13,
wherein said conversion-processing is to convert pixel values of said unsharp image-signals, based on a non-linear transform.

15. The image-processing apparatus of claim 13,
wherein said conversion-processing is determined by said original image-signal or said unsharp image-signals in said plurality of frequency-bands.

16. The image-processing apparatus of claim 13,
wherein said conversion-processing is determined by said original image-signal or said unsharp image-signals in an adjacent pair of frequency-bands.

17. The image-processing apparatus of claim 13,
wherein said conversion-processing varies depending on either one of pixel value of said unsharp image-signals employed for generating said differential image-signals or pixel values of said original image-signal.

18. The image-processing apparatus of claim 13,
wherein said conversion-processing varies depending on said unsharp image-signals.

19. The image-processing apparatus of claim 13,
wherein said conversion-processing is a suppression-processing for suppressing an averaging-processing for averaging image-signals.

20. The image-processing apparatus of claim 19,
wherein the lower a frequency-band in which said unsharp image-signals reside is, the greater a degree of suppressing said averaging-processing for averaging said image-signals in said suppression-processing is.

21. The image-processing apparatus of claim 19,
wherein the higher a frequency-band in which said unsharp image-signals reside is, the stronger a power of suppressing said averaging-action for averaging said image-signals in said suppression-processing is.

22. The image-processing apparatus of claim 13,
wherein said conversion-processing varies depending on pixel values of said unsharp image-signals to be processed by said conversion-processing.

23. The image-processing apparatus of claim 13,
wherein said conversion-processing varies depending on pixel values of an unsharp image-signal at a lowest frequency-band.

24. The image-processing apparatus of claim 13,
wherein said conversion-processing varies depending on pixel values of said original image-signal.

* * * * *